(12) United States Patent
Takahashi et al.

(10) Patent No.: US 6,878,459 B2
(45) Date of Patent: Apr. 12, 2005

(54) MAGNETIC RECORDING MEDIUM WITH CR UNDERFILM

(75) Inventors: Migaku Takahashi, 20-2, Hitokita 2-chome, Taihaku-ku, Sendai-shi, Miyagi-ken (JP); David Djayaprawira, Sendai (JP); Kazuya Komiyama, Sendai (JP); Satoru Yoshimura, Sendai (JP)

(73) Assignees: Migaku Takahashi, Miyagi-ken (JP); Anelva Corporation, Tokyo (JP); Fuji Electric Co., Ltd., Kanagawa (JP); Showa Denko K.K., Tokyo (JP)

( * ) Notice: Subject to any disclaimer, the term of this patent is extended or adjusted under 35 U.S.C. 154(b) by 2 days.

(21) Appl. No.: 10/026,709

(22) Filed: Dec. 27, 2001

(65) Prior Publication Data

US 2002/0127434 A1 Sep. 12, 2002

(30) Foreign Application Priority Data

Dec. 27, 2000 (JP) ........................................ 2000-396894

(51) Int. Cl.⁷ ................................................ G11B 5/66
(52) U.S. Cl. ........................ 428/611; 428/636; 428/664; 428/666; 428/668; 428/686; 428/215; 428/216; 428/336; 428/409; 428/694 TS
(58) Field of Search .................... 428/611, 636, 428/664, 666, 668, 686, 215, 216, 336, 409, 694 TS, 428 TS, 900; 360/131

(56) References Cited

U.S. PATENT DOCUMENTS

| | | | | | |
|---|---|---|---|---|---|
| 4,652,499 A | * | 3/1987 | Howard | ........................ | 428/641 |
| 5,851,582 A | * | 12/1998 | Tamari et al. | ............... | 427/130 |
| 5,853,847 A | * | 12/1998 | Takahashi | ................... | 428/141 |
| 6,255,006 B1 | * | 7/2001 | Ohnami et al. | ........ | 428/694 TS |
| 6,303,217 B1 | * | 10/2001 | Malhotra et al. | ........... | 428/332 |
| 6,423,431 B1 | * | 7/2002 | Wong et al. | ........... | 428/694 TS |
| 6,500,567 B1 | * | 12/2002 | Bertero et al. | .............. | 428/667 |
| 6,537,686 B1 | * | 3/2003 | Chen | .......................... | 428/678 |
| 6,544,667 B1 | * | 4/2003 | Hosoe et al. | ............... | 428/664 |
| 6,749,956 B1 | * | 6/2004 | Takahashi et al. | ..... | 428/694 TS |
| 2002/0001736 A1 | * | 1/2002 | Akimoto et al. | ......... | 428/694 T |
| 2002/0122960 A1 | * | 9/2002 | Hanawa et al. | ........ | 428/694 TS |
| 2002/0150793 A1 | * | 10/2002 | Maeda et al. | ........ | 428/694 TM |
| 2003/0129453 A1 | * | 7/2003 | Wong | ................... | 428/694 DE |

FOREIGN PATENT DOCUMENTS

JP 7-73433 3/1995

OTHER PUBLICATIONS

Djayaprawira et al. (IEEE Trans. Mag., 37(4), 2001, 1497–1499).*
Ikeda et al. (IEEE Trans. Mag., 33(5), 1997, 3079–3081).*
Hirayama et al. (J. App. Phys., 87(9), 2000, 6890–6892).*

* cited by examiner

*Primary Examiner*—Kevin M. Bernatz
(74) *Attorney, Agent, or Firm*—Young & Thompson

(57) ABSTRACT

A magnetic recording medium was a high normalized coercive force and superior thermal stability. The magnetic recording medium comprises a non-magnetic base material, and a ferromagnetic metal layer of cobalt based alloy formed on top of this base material with a metal underlayer disposed therebetween, and displays a coercive force Hc of at least 2000 (Oe) and an anisotropic magnetic field $Hk^{grain}$ of at least 10,000 (Oe). Furthermore, magnetic recording media in which the aforementioned metal underlayer and/or the ferromagnetic metal layer are fabricated in a film fabrication chamber with an ultimate vacuum at the $10^{-9}$ Torr level are preferred. A magnetic recording medium according to the present invention can be ideally applied to hard disks, floppy disks, and magnetic tapes and the like.

16 Claims, 9 Drawing Sheets

(a)

(b)

MAGNETIC RECORDING MEDIUM WITH CR UNDERFILM

BACKGROUND OF THE INVENTION

1. Field of the Invention

The present invention relates to a magnetic recording medium, a production method thereof, and a magnetic recording device, and more particularly to a magnetic recording medium with a high coercive force and anisotropic magnetic field and a production method thereof, as well as a magnetic recording device provided with such a magnetic recording medium. The magnetic recording medium of the present invention can be ideally applied to hard disks, floppy disks, and magnetic tapes and the like.

2. Description of the Background Art

In recent years, magnetic recording media have been widely used as high density, large capacity recording media in devices such as hard disks, although improvements are now required in recording and playback characteristics in order to achieve even higher densities.

FIG. 10 and FIG. 11 are schematic illustrations showing a hard disk as an example of a magnetic recording medium.

FIG. 10 is a perspective view of a disc shaped magnetic recording medium, and FIG. 11 is a schematic cross-sectional view along the line A—A shown in FIG. 10.

A magnetic recording medium 90 shown in FIG. 10 comprises a disc shaped base material 91 of a non-magnetic material, and a metal underlayer 94, a ferromagnetic metal layer 95 and a protective layer 96 formed on top of this base material 91, as shown in FIG. 11.

In the magnetic recording medium 90 of this example, the base material 91 of a non-magnetic material utilizes, for example, a non-magnetic layer 93 comprising Ni—P provided on the surface of a substrate 92 comprising an aluminum based alloy or glass. A metal underlayer 94 of Cr for example, a ferromagnetic metal layer 95 comprising a magnetic film of CoCrTa or CoCrTaPt, and a protective layer 96 of carbon or the like are then layered sequentially on top of the base material 91. The typical thickness values for each of these layers are 5 μm to 15 μm for the non-magnetic (Ni—P) layer 93, 50 nm to 150 nm for the metal (Cr) underlayer 94, 30 nm to 100 nm for the ferromagnetic metal layer 95, and 20 nm to 50 nm for the protective layer 96. Although not shown in the drawings, a coating of a fluorine based lubricant such as perfluoro polyether may also be provided on top of the protective layer 96.

The inventor of the present invention have already reported [M. Takahashi, A. Kikuchi and S. Kawakita: IEEE Trans. on Magn., 33, 2938 (1997)] that in order to improve the recording and playback characteristics of a magnetic recording medium of the construction described above, a reduction in the interaction between the magnetic crystal grains which make up the magnetic film which functions as the ferromagnetic metal layer 95, and a reduction in the film thickness of the magnetic film, are essential.

In particular, in order to achieve a reduction in noise level for the medium, the above reference introduces a fabrication method effective for miniaturizing the magnetic crystal grains of the magnetic film, by reducing the film thickness of the ferromagnetic metal layer 95.

However, there are limits to the microstructure control and volume reduction in the magnetic grains which are possible by reduction in the thickness of the magnetic film comprising the ferromagnetic metal layer 95. The reason being that as the thickness of the magnetic film comprising the ferromagnetic metal layer 95 is reduced, there is an accompanying miniaturization of the crystal grains which make up the magnetic film, and a problem arises in that the magnetic characteristics, such as the magnetization (residual magnetization) recorded on the magnetic film, can vary significantly over time. In other words, the magnetic film becomes more susceptible to thermal agitation.

The inventor of the present invention have keenly pursued the development of a method for reducing the grain diameter of the crystal grains of a magnetic film by reducing the film thickness of the metal underlayer 94, in other words, a method of reducing the volume of the crystal grains of the magnetic film. Specifically, by developing a method of preparing a medium comprising a Cr underlayer and a Co based magnetic layer under ultra clean process conditions, the inventor succeeded in developing a medium capable of achieving a coercive force exceeding 2000 (Oe) even with an ultra thin Cr layer with a thickness of 2.5 nm as the metal underlayer 94 (International Patent Application No. PCT/JP97/01092).

However, it is thought that further miniaturization of the magnetization pattern recorded on the magnetic recording medium is required when the recording density is increased, and consequently, a magnetic film in which the magnetic characteristics such as the residual magnetization do not vary significantly over time, even if the grain diameter of the crystal grains which make up the magnetic film is reduced by reducing the film thickness of the magnetic film, in other words, a magnetic film which is capable of suppressing thermal agitation and ensuring thermally stable magnetic characteristics, has been keenly sought.

SUMMARY OF THE INVENTION

An object of the present invention is to provide a magnetic recording medium with a high normalized coercive force value which also displays superior thermal stability.

Another object of the present invention is to provide a method of producing a magnetic recording medium with the above characteristics.

Yet another object of the present invention is to provide a magnetic recording device comprising a magnetic recording medium with the aforementioned superior characteristics.

The inventor of the present invention have considered carefully the background research to date in their continuing research of magnetic materials, and have recently achieved the research results described below, which form the basis for the invention of the present application.

In order to realize a high recording density magnetic recording medium with superior recording and playback characteristics, the inventor of the present invention have previously disclosed in International Patent Application No. PCT/JP94/01184 that the magnetic film of the aforementioned ferromagnetic metal layer 95 should preferably have a high coercive force (Hc) value and a high anisotropic magnetic field ($Hk^{grain}$) and should moreover have a value for the normalized coercive force ($Hc/Hk^{grain}$) of at least 0.3, and furthermore, that a magnetic recording medium with these types of magnetic characteristics can be produced using an ultra clean process.

The normalized coercive force ($Hc/Hk^{grain}$) in the present invention is the value obtained by dividing the coercive force Hc by the anisotropic magnetic field ($Hk^{grain}$) of the crystal grains of the magnetic film, and represents the degree of improvement in the magnetic isolation of the crystal grains of the magnetic film.

In other words, the fact that the normalized coercive force of a magnetic film is high means that the magnetic interaction between each of the crystal grains which make up the magnetic film is lower, and as a result, a higher coercive force can be achieved.

According to the aforementioned patent application, the ultra clean process described above enables the formation of a magnetic recording medium which utilizes a magnetization switching wherein the oxygen concentration of the metal underlayer and/or the ferromagnetic metal layer is no more than 100 wtppm, and the film fabrication conditions for the ultra clean process for producing this type of magnetic recording medium differ from the film fabrication conditions of a typical conventional process in terms of the factors described below.

In other words, according to the aforementioned application, a comparison of the film fabrication conditions of the ultra clean process with more typical film fabrication conditions reveals that whereas the back pressure of the film fabrication chamber in the ultra clean process is at the $10^{-9}$ Torr level, the back pressure in a more typical film fabrication process is at the $10^{-7}$ Torr level. Furthermore, in terms of the Ar gas used in the film fabrication, whereas the ultra clean process utilizes UC-Ar ("Ultra clean Ar" with an impurity concentration of no more than 100 ppb, and preferably no more than 10 ppb), a typical film fabrication process utilizes normal Ar (with an impurity concentration of at least 1 ppm).

Furthermore, in the International Patent Application No. PCT/JP97/01092, the inventor of the present invention reveal that by setting the relationship between the saturated magnetization (Ms) of the magnetic film of the recording layer 95 and the anisotropic magnetic field ($Hk^{grain}$) so that ($4\pi Ms/Hk^{grain}$)≦1.0, a high normalized coercive force of at least 0.35 can be achieved independently of the crystal grain diameter of the magnetic film, and moreover that a magnetic recording medium for which ($4\pi Ms/Hk^{grain}$)≦1.0 can be formed using an ultra clean process (using the techniques disclosed in International Patent Application No. PCT/JP94/01184).

In addition, the fact that a reduction in the magnetic film thickness is accompanied by a miniaturization of the crystal grains which make up the magnetic film and an increase in susceptibility to the effects of thermal agitation, and the fact that materials with larger values for the crystalline magnetic anisotropy ($Ku^{grain}$) of the magnetic film display less variation over time in the residual magnetization, were revealed clearly by the inventor of the present invention in the reference shown below, published in March 1999. The crystalline magnetic anisotropy $Ku^{grain}$ refers to a value equal to ½ of the product of the saturated magnetization (Ms) and the anisotropic magnetic field $Hk^{grain}$.

("Physics of high density recording thin film media established by ultra clean sputtering process" by M. Takahashi and H. Shoji, J. Magn. Magn. Mater., 193 (1999) 44–51).

In a conventional magnetic recording medium, the maximum value of the crystalline magnetic anisotropy $Ku^{grain}$ for the most widely used Co based alloy magnetic films was approximately $1.3 \times 10^6$ erg/cm$^3$ in the case of a CoNiCr alloy film, and $1.4 \times 10^6$ erg/cm$^3$ in the case of a CoCrTa alloy film.

In contrast, in the case of a CoCrTaPt alloy film produced using a recent ultra clean process, a crystalline magnetic anisotropy $Ku^{grain}$ of approximately $2.5 \times 10^6$ erg/cm$^3$ can be achieved, and as reported by the inventor of the present invention in the reference shown below, published in October 1997, this value represents the highest level of thermal stability for a conventional Co based material.

However, in such material compositions, even if the value of the crystalline magnetic anisotropy ($Ku^{grain}$) is considerably large, the normalized coercive force ($Hc/Hk^{grain}$) is still small at no more than 0.30, and a large medium noise value can be expected.

CoCrPt thin film magnetic recording media prepared in a clean environment (magnetic anisotropy and microstructure), M. Takahashi, A. Kikuchi, H. Mitsuya, T. Yoshimura, H. Shoji, Proceedings of the 21st conference of the Magnetics Society of Japan (1997) p165.

In order to suppress thermal agitation and ensure thermally stable magnetic characteristics even when the magnetic pattern recorded onto the magnetic recording medium has been miniaturized accompanying the move to a higher recording density, a magnetic recording medium must be provided with a magnetic film with a high value for the normalized coercive force, namely, an index of magnetic exchange interaction, and a value for $4\pi Ms/Hk^{grain}$, which functions as an index of magnetostatic interaction, of no more than 1.0, and moreover with a crystalline magnetic anisotropy which is higher than conventional films.

From the background information described above, the inventor of the present invention consider that an effective method of reducing the value of the aforementioned $4\pi Ms/Hk^{grain}$ and increasing the normalized coercive force, while obtaining a magnetic recording medium which is comparatively unaffected by thermal agitation, is to employ a magnetic film with a high $Hk^{grain}$ value for the ferromagnetic metal layer.

As a result of researching the structure of magnetic recording media with this type of magnetic film with a high $Hk^{grain}$ value, the inventor finalized the present invention.

In other words, a magnetic recording medium according to the present invention is a magnetic recording medium comprising a non-magnetic base material, and a ferromagnetic metal layer of a cobalt based alloy formed on top of this non-magnetic base material with a metal underlayer disposed therebetween, wherein the coercive force Hc is at least 2000 (Oe), and the anisotropic magnetic field $Hk^{grain}$ is at least 10,000 (Oe).

In a magnetic recording medium according to the present invention, the aforementioned metal underlayer and/or the ferromagnetic metal layer should preferably be formed in a film fabrication chamber with an ultimate vacuum at the $10^{-9}$ Torr level, using a film fabrication gas with an impurity concentration of no more than 1 ppb.

In a magnetic recording medium according to the present invention, the aforementioned metal underlayer should incorporate an underfilm of Cr or a Cr alloy, and this Cr alloy should preferably also incorporate Mo and/or W.

In a magnetic recording medium according to the present invention, the aforementioned metal underlayer should incorporate an underfilm of Cr or a Cr alloy, and this Cr alloy should preferably incorporate one, or two or more elements selected from the group consisting of V, Nb, Hf, Zr, Ti, Mn, Ta, Ru, Re, Os, Ir, Rh, Pd, Pt, P, B, Si, Ge, N and O.

In a magnetic recording medium according to the present invention, the film thickness of the aforementioned metal underlayer should preferably be within a range from 3 nm to 20 nm.

In a magnetic recording medium according to the present invention, the aforementioned metal underlayer should preferably comprise a layered structure of 2 or more underfilms with different lattice constants.

In a magnetic recording medium according to the present invention, the aforementioned metal underlayer should preferably be a 2 layered construction with a second underfilm layered on top of a first underfilm, and the film thickness ratio $t_2/t_1$ of the film thickness $t_1$ of the aforementioned first underfilm and the film thickness $t_2$ of the aforementioned second underfilm should preferably be within a range from 0.2 to 5.0.

In a magnetic recording medium according to the present invention, the film thickness of the aforementioned first underfilm should preferably be within a range from 1.5 nm to 8.5 nm.

In a magnetic recording medium according to the present invention, the film thickness of the aforementioned second underfilm should preferably be within a range from 1.5 nm to 8.5 nm.

In a magnetic recording medium according to the present invention, the lattice misfit of the aforementioned metal underlayer and the aforementioned ferromagnetic metal layer as determined by the equation $(y-x)/(x/2+y/2) \cdot 100$, wherein x represents the length obtained by multiplying by $\sqrt{2}$ the lattice constant of the crystal lattice of the metal underlayer immediately below the aforementioned ferromagnetic metal layer, and y represents the c axis length of the crystal lattice of the aforementioned ferromagnetic metal layer, should preferably be from 0.5% to 2.5%.

In a magnetic recording medium according to the present invention, a lattice misfit of the aforementioned metal underlayer and the aforementioned ferromagnetic metal layer of 0.5% to 1.5% is even more desirable.

In a magnetic recording medium according to the present invention, in the crystal lattice of the aforementioned ferromagnetic metal layer of a cobalt based alloy, the interatomic distance a in the direction of a normal line to the ferromagnetic metal layer should preferably be larger than the interatomic distance b in a direction within the plane of the ferromagnetic metal layer.

In a magnetic recording medium according to the present invention, in the crystal lattice of the aforementioned ferromagnetic metal layer, the axial length ratio a/b of the interatomic distance a in the direction of a normal line to the non-magnetic base material relative to the interatomic distance b within the plane of the non-magnetic base material should preferably be within a range from 1.002 to 1.008.

A production method for a magnetic recording medium according to the present invention is a method of producing a magnetic recording medium in which a ferromagnetic metal layer of a cobalt based alloy is formed using a film fabrication method on top of a non-magnetic base material with a metal underlayer disposed therebetween, wherein in order to achieve a coercive force Hc of at least 2000 (Oe) and an anisotropic magnetic field $Hk^{grain}$ of at least 10,000 (Oe), the lattice misfit of the aforementioned metal underlayer and the aforementioned ferromagnetic metal layer as represented by the equation $(y-x)/(x/2+y/2) \cdot 100$ (%), where x represents the length obtained by multiplying by $\sqrt{2}$ the lattice constant of the aforementioned metal underlayer, and y represents the c axis length of the crystal lattice of the aforementioned ferromagnetic metal layer, is set to a value between 0.5% and 2.5%.

A production method of a magnetic recording medium according to the present invention is the method of producing a magnetic recording medium described above, wherein in order to control the aforementioned lattice misfit, a positive or negative bias of 0 V to 300 V is applied to the base material during film fabrication of the aforementioned metal underlayer.

A production method of a magnetic recording medium according to the present invention is the method of producing a magnetic recording medium described above, wherein in order to control the aforementioned lattice misfit, a positive or negative bias of 0 V to 300 V is applied to the base material during film fabrication of the aforementioned ferromagnetic metal layer.

A magnetic recording device according to the present invention comprises a magnetic recording medium according to any one of the above descriptions, a drive section for driving the magnetic recording medium, and a magnetic head for carrying out recording and playback of magnetic information, wherein the magnetic head performs recording and playback of magnetic information on the moving aforementioned magnetic recording medium.

As described above in detail, by achieving a coercive force Hc for the magnetic recording medium of at least 2000 (Oe) and moreover an anisotropic magnetic field $Hk^{grain}$ of at least 10,000 (Oe), the present invention is able to increase the value of the crystalline magnetic anisotropic energy $Ku^{grain}$, and is consequently able to achieve a magnetic recording medium with a high normalized coercive force and superior thermal stability.

Furthermore, if film fabrication of the aforementioned metal underlayer and/or the ferromagnetic metal layer is conducted in a film fabrication chamber with an ultimate vacuum at the $10^{-9}$ Torr level, using a film fabrication gas with an impurity concentration of no more than 1 ppb, then even in cases in which the metal underlayer is produced as a thin film, a sufficiently high coercive force can still be achieved, and so an even higher normalized coercive force can be obtained.

According to the present invention, by setting the lattice misfit of the aforementioned metal underlayer and the aforementioned ferromagnetic metal layer, as represented by the equation $(y-x)/(x/2+y/2) \cdot 100$ (%) where x represents the length obtained by multiplying by $\sqrt{2}$ the lattice constant of the aforementioned metal underlayer, and y represents the c axis length of the crystal lattice of the aforementioned ferromagnetic metal layer, to a value between 0.5% and 2.5% in order to achieve a coercive force Hc of at least 2000 (Oe) and an anisotropic magnetic field $Hk^{grain}$ of at least 10,000 (Oe), a production method can be provided which enables the stable production of a magnetic recording medium with the superior characteristics described above.

Furthermore, provided a magnetic recording device is equipped with a magnetic recording medium with the superior magnetic characteristics described above, then a magnetic recording device can be provided which suffers no deterioration in magnetic characteristics even after prolonged use in a heated state. Furthermore, provided a magnetic recording device is equipped with a magnetic recording medium with the superior magnetic characteristics described above, then a magnetic recording device can be provided which displays a high S/N ratio and superior recording and playback characteristics.

DETAILED DESCRIPTION OF THE PREFERRED EMBODIMENTS

As follows is a description of embodiments of the present invention with reference to the drawings.

Figure 1:
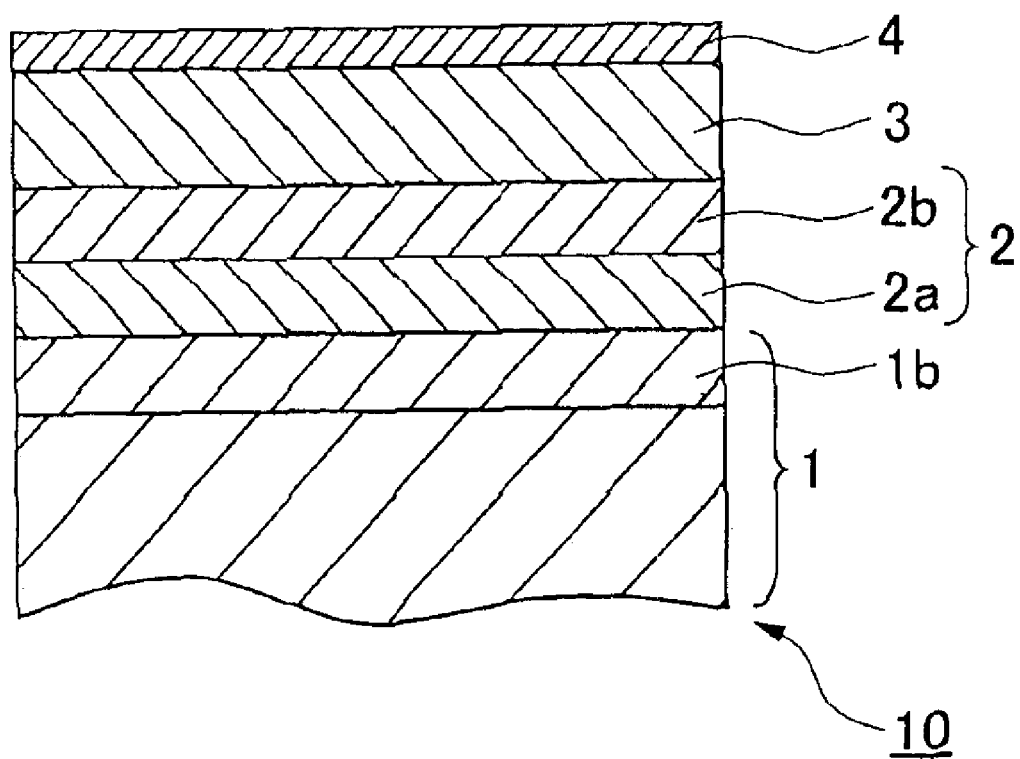
FIG. 1 is a partial cross-sectional view showing a schematic representation of a magnetic recording medium of an embodiment of the present invention.

FIG. 1 is a diagram showing a schematic representation of the cross-sectional structure of an embodiment of a magnetic recording medium of the present invention which has been adapted for use as a hard disk in a computer. In the diagram, a magnetic recording medium 10 is constructed of a ferromagnetic metal layer 3 of a ferromagnetic alloy formed on top of a base material 1 comprising a disc shaped non-magnetic material with a multi-layer structure metal underlayer 2 comprising a first underfilm 2a and a second underfilm 2b disposed therebetween, and with a protective layer 4 formed on top.

The layered structure of the magnetic recording medium 10 of this embodiment shown in FIG. 1 is the most basic structure for a magnetic recording medium according to the present invention, and structures in which other intermediate layers are provided between the base material 1 and the protective layer 4 are possible, as are structures in which a lubrication layer of a fluorine based lubricant is provided on top of the protective layer 4.

As follows is a more detailed description of the magnetic recording medium 10 of this embodiment of the present invention.

(Base Material)

Examples of the base material 1 according to the present invention include materials comprising a substrate 1a of aluminum or an alloy or oxide thereof, titanium or an alloy or oxide thereof, or silicon, glass, carbon, ceramic, plastic, resin, or a complex of such materials, onto which has been surface coated a non-magnetic layer 1b of a different material using either sputtering, vapor deposition, or plating techniques.

The non-magnetic layer 1b provided on the surface of the base material 1 should preferably not undergo magnetization at high temperatures, should display conductivity and be easily tooled mechanically, and yet also offer a suitable degree of surface hardness. Examples of preferred non-magnetic films which satisfy these conditions include, in particular, Ni—P films prepared by plating techniques.

In terms of the shape of the base material 1, in the case of applications to disk production, a donut shaped circular base material is used. The base materials provided with ferromagnetic metal layers and the like described below, namely the magnetic recording media, are rotated about a central axis during magnetic recording or playback, with a rotational speed of 3600 rpm to 15,000 rpm. During such rotation, the magnetic head flies across either the upper surface or the lower surface of the magnetic recording medium at a height of approximately 0.1 μm or several dozen nm. Furthermore, magnetic heads with an even lower flying height of no more than 10 nm are also being developed.

Consequently, base materials 1 for which the flatness of the upper and lower surfaces, the parallel nature of the upper and lower surfaces, the circumferential waviness, and the surface roughness are suitably controlled are desirable.

Furthermore, when the base material rotates or stops, then the surfaces of the magnetic recording medium and the magnetic head make contact and slide (Contact Start Stop: CSS). As a countermeasure, substantially concentric fine scratches (texture) may be formed on the surface of the base material by polishing with a slurry or tape incorporating abrasive grains such as diamond or alumina, thereby preventing adsorption when the magnetic head contacts the surface.

Figure 11:
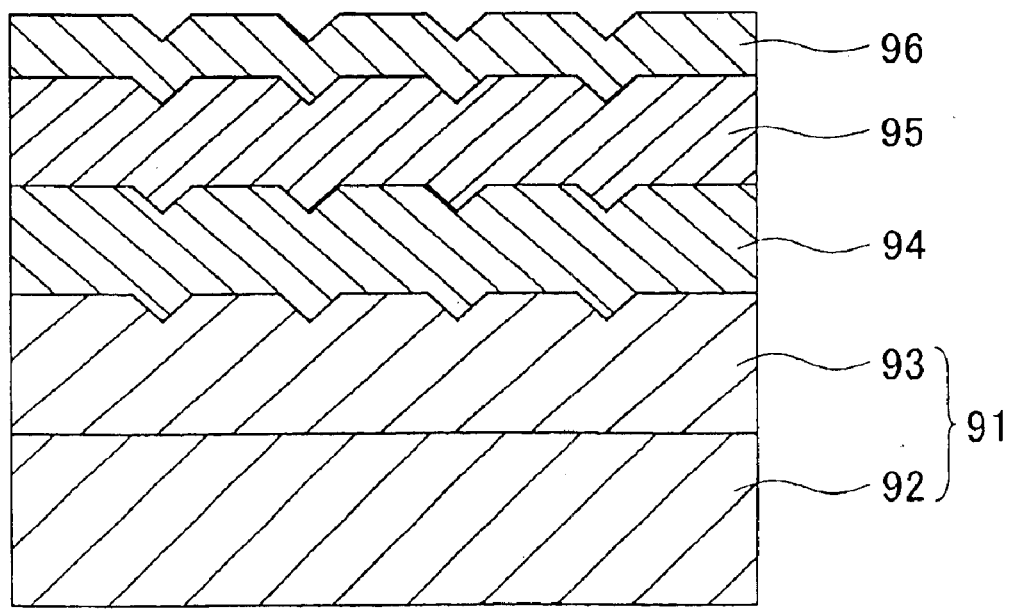
FIG. 11 is a diagram showing the cross-sectional structure of a conventional hard disk as an example of a magnetic recording medium.

The aforementioned texture typically comprises the formation of V shaped grooves by scratching the surface with a polishing tape, as shown on the upper surface of the non-magnetic Ni—P layer 93 of the conventional structure shown in FIG. 11. Consequently, a similar texture may also be formed on the surface of the non-magnetic layer 1b comprising Ni—P or the like in a structure of the present embodiment. Furthermore, alternative textures aimed at improving the aforementioned head sliding characteristics include textures formed by laser treatment, discrete undulating film textures produced by sputtering, and undulating textures produced by etching of the protective layer, and of course these alternative types of structures may also be used in forming an undulating pattern of a desired shape on the upper surface of the non-magnetic layer 1b. In addition, recently devices have appeared with a system in which the magnetic head is loaded and unloaded relative to the magnetic recording medium, so that when the magnetic recording medium is stopped, the magnetic head is placed in a standby mode outside the magnetic recording medium. If this type of system is utilized, then in some cases, structures in which the texture is omitted are also possible.

Furthermore, the aforementioned texture performs a particularly important role in systems in which the magnetic information is recorded along a direction within the plane of the ferromagnetic metal layer, and by forming a texture of approximately concentric circles on the surface of the base material 1, the orientation plane of the metal underlayer 2 formed on top of the base material 1 can be altered, and as a result, the crystal grains of the ferromagnetic metal layer 3 formed on top of the metal underlayer 2 can be oriented in the circumferential direction of the base material.

The orientation control of the magnetic crystal grains resulting from this texture treatment has a significant effect on the magnetic characteristics and the recording and playback characteristics of the magnetic recording medium during recording and playback, and so it is desirable that the density of the formed grooves and the uniformity of the depth of the grooves is suitably controlled in such a texture aimed at controlling the orientation of the magnetic crystal grains.

(Metal Underlayer)

A metal underlayer 2 of a magnetic recording medium 10 according to the present embodiment is a multi-layered structure formed by sequentially forming a first underfilm 2a and a second underfilm 2b using a technique such as sputtering or vapor deposition.

These underfilms 2a, 2b are formed using materials with mutually different lattice constants. Adopting such a structure enables the coercive force of the ferromagnetic metal layer 3 formed on top of the second underfilm 2b to be increased. Furthermore, the aforementioned metal underlayer 2 may also be constructed of 3 or more layers of underfilms.

The aforementioned underfilms 2a, 2b should preferably utilize Cr or a Cr alloy, and CrMo alloy and CrW alloy are particularly preferred. Furthermore, examples of other Cr alloys which offer similar effects to the CrMo alloy and CrW alloy mentioned above include alloys of Cr with either one, or two or more elements selected from the group of elements comprising V, Nb, Hf, Zr, Ti, Mn, Ta, Ru, Re, Os, Ir, Rh, Pd, Pt, P, B, Si, Ge, N and O. Cr or any of these Cr alloys, provided they are used in a combination of materials with different lattice constants, can be suitably applied to either of the underfilms 2a and 2b.

By using either Cr or a Cr alloy for the underfilms 2a, 2b, a segregation action can be caused within the ferromagnetic metal layer 3 formed on top of the metal underlayer 2. As a result, the magnetic interaction between crystal grains of the ferromagnetic metal layer 3 can be suppressed, enabling the normalized coercive force to be increased. Furthermore, the easy axis (c axis) of the ferromagnetic metal layer 3 formed on top of the metal underlayer 2 is also able to adopt a direction within the plane of the base material. In other words, crystal growth of the ferromagnetic metal layer 3 is promoted in a direction which increases the coercive force within the plane of the base material.

Furthermore, in those cases where a glass substrate is used for the base material 1, a seed layer of Ni—Al or the like should preferably be provided between the metal underlayer 2 and the base material 1. By employing this type of structure, the crystal grains of the metal underlayer 2 and the ferromagnetic metal layer 3 are miniaturized, and so the coercive force of the magnetic recording medium can be increased, while the noise characteristics of the medium during recording and playback are also improved.

In those cases where the Cr or a Cr alloy metal underlayer 2 is formed using sputtering techniques, the film fabrication factors which control the resulting crystallinity include the surface shape of the base material (including the presence or absence of texture), the surface state, the surface temperature, the pressure during film fabrication, the bias applied to the base material, and the thickness of the film being formed.

The coercive force of the ferromagnetic metal layer 3 described below displays a tendency to increase substantially proportionally with increases in the film thickness of the Cr film or Cr alloy film of the metal underlayer, although there is also a tendency for an increase in the surface roughness of the formed film accompanying any increase in the film thickness. However, in order to improve the recording density of the magnetic recording medium, the flying height of the magnetic head above the surface of the magnetic recording medium needs to be reduced as much as possible. Consequently, it is desirable that the metal underlayer 2 is constructed using a material which is capable of producing a high coercive force even if the film of the metal underlayer 2 is thin.

According to the present invention, by constructing the metal underlayer 2 from the two layers of the underfilms 2a, 2b, a high coercive force of at least 2000 (Oe) can be achieved, and at the same time a magnetic recording medium with a high $Hk^{grain}$ value of at least 10,000 (Oe) can also be obtained.

The reasons for the above observation are thought to include the fact that by providing a metal underlayer 2 with the type of two layer structure described above, an underfilm which displays a favorable match relative to a high $Hk^{grain}$ ferromagnetic metal layer 3 can be positioned immediately below the ferromagnetic metal layer 3 thereby promoting crystal growth of the ferromagnetic metal layer 3 and raising the coercive force, and the fact that by positioning a first underfilm 2a with a different lattice constant from the second underfilm 2b between the second underfilm 2b and the base material 1, irregularity in the crystal grain diameter of the second underfilm 2b can be suppressed, and the orientation of the second underfilm 2b can be improved. Consequently, Cr segregation towards the crystal grain boundaries of the ferromagnetic metal layer 3 is promoted, the values for the anisotropic magnetic field $Hk^{grain}$, the normalized coercive force ($Hc/Hk^{grain}$), and the coercive force Hc can be increased, and the medium noise can also be reduced.

(Film Thickness Ratio $t_2/t_1$ of the Underlayer)

In those cases in which the metal underlayer 2 of a magnetic recording medium according to the present invention is formed by sequentially layering a first underfilm 2a and a second underfilm 2b, the film thickness ratio $t_2/t_1$ of the film thickness $t_1$ of the first underfilm 2a and the film thickness $t_2$ of the second underfilm 2b should preferably be controlled so as to fall within a predetermined range. Provided the film thickness ratio $t_2/t_1$ is maintained within this range, the lattice matching of these underfilms 2a, 2b with the lattice of the ferromagnetic metal layer 3 can be optimized and a high coercive force can be achieved, and even in those cases where a conventional process is used instead of an ultra clean process, a magnetic recording medium with a high coercive force can still be obtained.

If the metal underlayer 2 is formed using an ultra clean process, then forming the underfilms 2a, 2b as ultra thin films produces a higher coercive force. Specifically, forming the first underfilm 2a and the second underfilm 2b with a thickness within a range from 1.5 nm to 8.5 nm enables a higher coercive force to be achieved. Consequently, the crystal grains of the ferromagnetic metal layer can be miniaturized, and a magnetic recording medium with a favorable S/N ratio and a high normalized coercive force can be obtained.

Furthermore, in those cases where the metal underlayer 2 is formed using a conventional process rather than an ultra clean process, then in addition to ensuring that the film thickness ratio $t_2/t_1$ of the underfilms 2a, 2b of the metal underlayer 2 fall within the aforementioned range, the films themselves should be formed with film thickness values greater than those used in the aforementioned ultra clean process.

(Ferromagnetic Metal Layer)

A ferromagnetic metal layer 3 used in the present invention is a ferromagnetic metal layer with an hcp structure.

The material for forming the ferromagnetic metal layer 3 should preferably utilize a Co based ferromagnetic alloy comprising Co as a main constituent. Specific examples of such materials include CoNiCr, CoCrTa, CoCrPt, CoNiPt, CoNiCrTa and CoCrPtTa. Furthermore, alloys in which one, or two or more elements selected from a group comprising B, N, O, Nb, Zr, Cu, Ge and Si are added to the above alloys may also be used.

In the present invention, by preparing the metal underlayer 2 and the ferromagnetic metal layer 3 in an ultra clean atmosphere which offers cleaner conditions than conventional film fabrication conditions (namely, the aforementioned ultra clean process), the following two features can be realized.

(1) For a medium in which the relationship between the saturated magnetization Ms and the anisotropic magnetic field $Hk^{grain}$ of the ferromagnetic metal layer satisfies the requirement $4\pi Ms/Hk^{grain} \leq 1$, a high normalized coercive force ($Hc/Hk^{grain}$) can be achieved with good stability, regardless of the crystal grain diameter of the ferromagnetic metal layer.

(2) Within the feature (1) described above, a medium in which the grain diameter of each of the crystal grains which make up the ferromagnetic metal layer is no more than 10 nm is able to offer an improved S/N ratio and a reduced degree of medium surface roughness.

Figure 2:
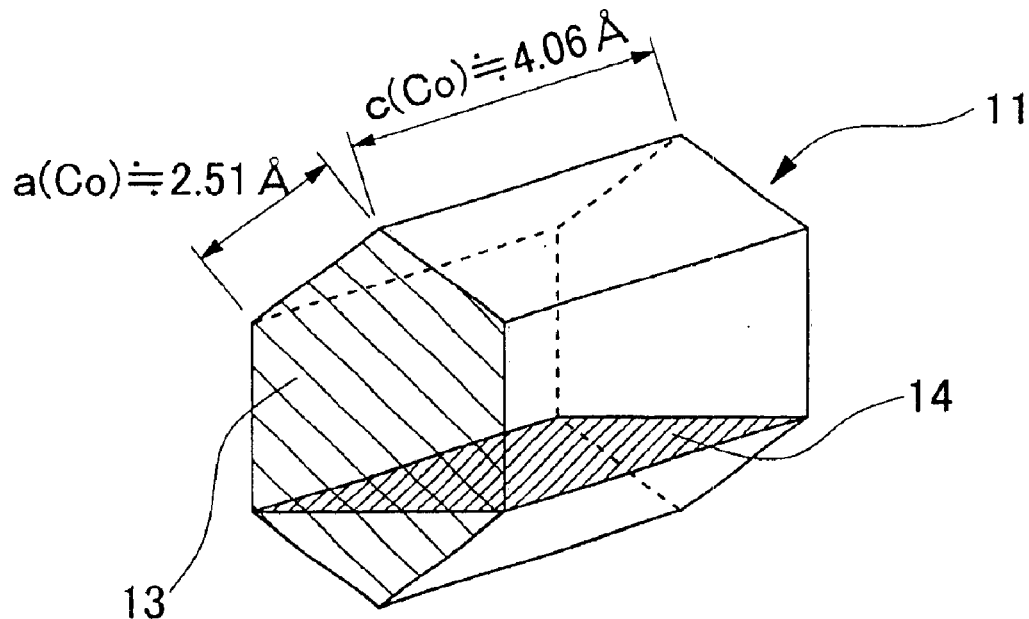
FIG. 2(a) is a perspective view showing a schematic representation of a crystal lattice of a ferromagnetic metal layer of a magnetic recording medium according to the present invention.
FIG. 2(b) is a perspective view showing a schematic representation of a crystal lattice of a metal underlayer.
Figure 2:
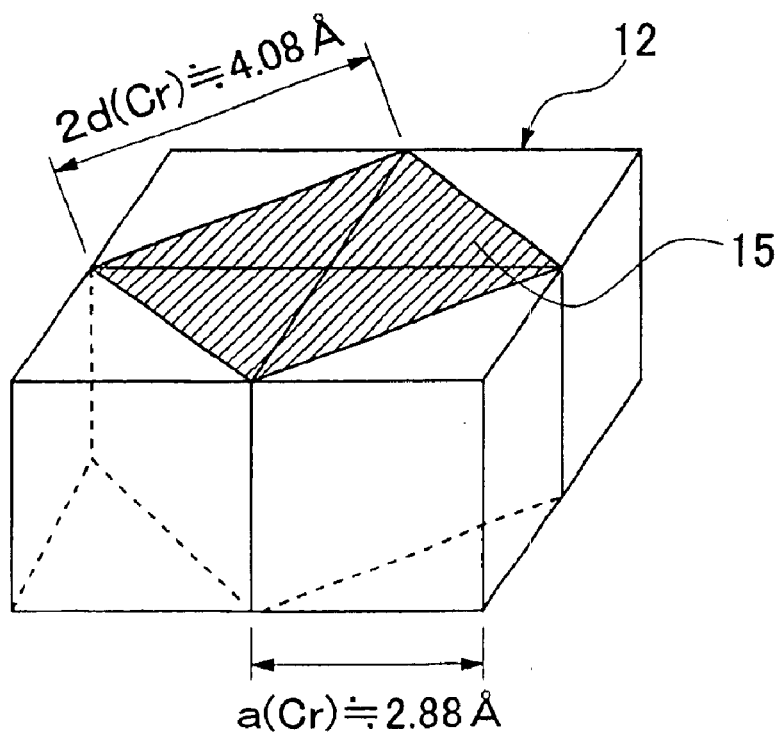
Figure 3:
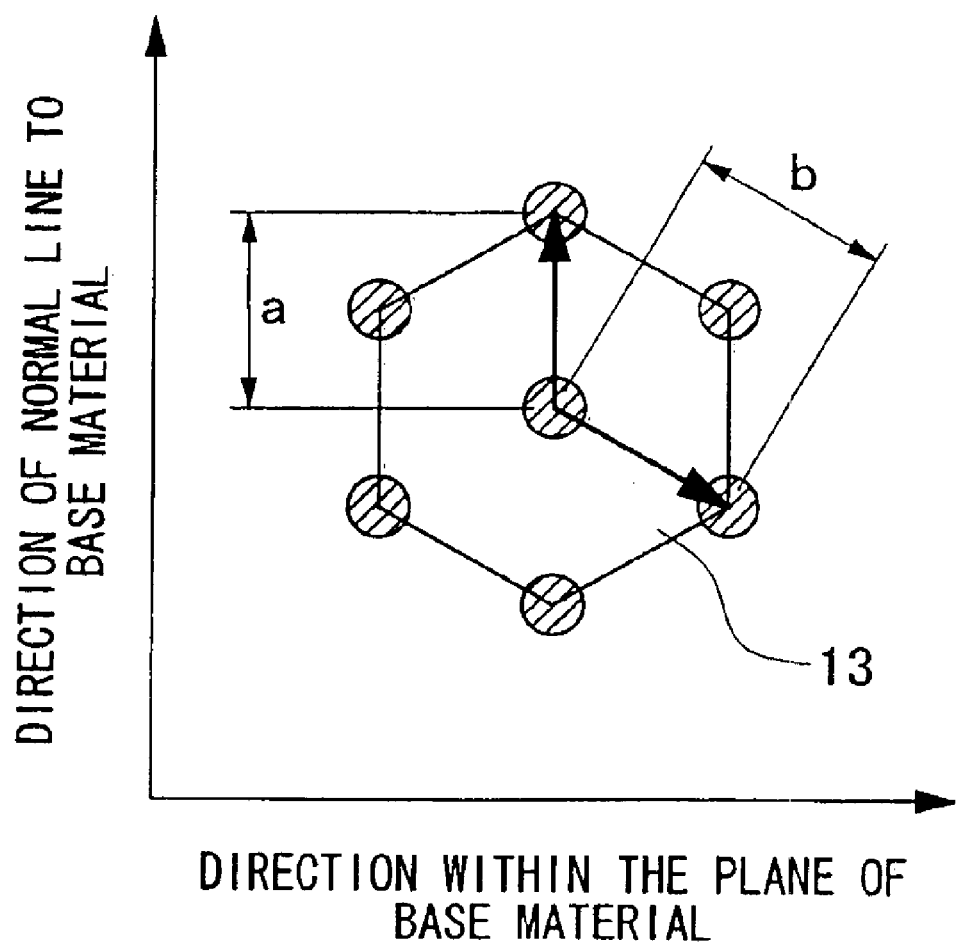
FIG. 3 is a plan view showing a schematic representation of the (002) plane of the hcp crystal lattice shown in FIG. 2(*a*).

Furthermore, the crystal grains which make up the aforementioned ferromagnetic metal layer 3 in a magnetic recording medium of the present invention display a special feature in terms of distortion of the crystal lattice. This distortion of the crystal lattice is described below in more detail, with reference to FIG. 2 and FIG. 3. FIG. 2 presents schematic representations of each of the crystal lattices at the interface between the metal underlayer 2 and the ferromagnetic metal layer 3, wherein FIG. 2(a) shows the crystal lattice of the ferromagnetic metal layer 3, and FIG. 2(b) shows the crystal lattice of the metal underlayer 2. FIG. 3 is a schematic representation showing an enlargement of the (002) plane 13 of the magnetic grain shown in FIG. 2(a).

The crystal lattices 11, 12 shown in FIGS. 2(a) and FIG. 2(b) respectively, represent the crystal lattice of a magnetic grain with an hcp structure within the ferromagnetic metal layer 3, and a crystal lattice with a bcc structure within the metal underlayer 2 (second underfilm 2b) respectively. In the magnetic recording medium 10 shown in FIG. 1, the atoms of the plane labeled with the symbol 15 in FIG. 2(b) match with the atoms of the plane labeled with the symbol 14 in FIG. 2(a), and the crystal grains of the ferromagnetic metal layer 3 are grown epitaxially on top of the metal underlayer 2. In other words, the easy axis of the magnetic grains, namely the c axis, is oriented in a direction within the plane of the base material 1. This occurs because the c axial length of the hcp crystal lattice shown in FIG. 2(a) and the diagonal length of the bcc crystal lattice shown in FIG. 2(b) are very similar values.

In this type of system, in which the crystal lattice matching at the interface between the metal underlayer 2 and the ferromagnetic metal layer 3 causes epitaxial growth, the matching has a particularly large effect on the crystallinity and orientation of the film which grows on top (the ferromagnetic metal layer 3). Consequently, by suitably controlling this crystal lattice matching, the coercive force Hc, the anisotropic magnetic field $Hk^{grain}$, and the normalized coercive force ($Hc/Hk^{grain}$) can be increased.

In a magnetic recording medium according to the present invention, the lattice misfit of the metal underlayer 2 and the ferromagnetic metal layer 3, as determined by the equation $(y-x)/(x/2+y/2) \cdot 100$ (%), wherein x represents the diagonal length of the crystal lattice of the metal underlayer 2 (the length obtained by multiplying the lattice constant by $\sqrt{2}$), and y represents the c axis length of the crystal lattice of the ferromagnetic metal layer 3, should preferably be from 0.5% to 2.5%. In other words, in a magnetic recording medium of the present invention, rather than seeking a lattice misfit represented by the above equation of close to 0% as in conventional magnetic recording media, it is preferable that the diagonal length x of the crystal lattice of the metal underlayer 2 is intentionally kept to a length shorter than the c axis length y of the crystal lattice of the ferromagnetic metal layer 3, and the lattice misfit controlled to a value within the aforementioned range.

It is thought that the reason for this requirement is that in those cases where the diagonal length x of the crystal lattice of the metal underlayer 2 is shorter than the c axis length of the ferromagnetic metal layer 3, crystal growth of the ferromagnetic metal layer 3 is restricted to in-plane growth, and consequently the c axis of the ferromagnetic metal layer 3 grows preferentially in a direction within the plane of the layer. As a result, Cr segregation towards the crystal grain boundaries of the ferromagnetic metal layer 3 is promoted, the values for the anisotropic magnetic field $Hk^{grain}$, the normalized coercive force ($Hc/Hk^{grain}$), and the coercive force Hc can be increased, and the medium noise can also be reduced.

In addition, values of the aforementioned lattice misfit from 0.5% to 1.5% are even more desirable. Provided the lattice misfit is held within this range, then an even higher coercive force can be realized, and the normalized coercive force can also be improved even further.

Furthermore, the ferromagnetic metal layer 3 of a magnetic recording medium 10 of the present invention has a distortion in the crystal lattice due to the multi-layered metal underlayer 2. Specifically, as shown in FIG. 3, the interatomic distance a in the direction of a normal line to the base material of the hcp lattice, which is oriented so that the c axis is parallel with a direction within the plane of the base material, is larger than the interatomic distance b in a direction within the plane of the base material, namely the distortion causes the crystal lattice to be elongated in the direction of a normal line to the base material.

In a magnetic recording medium according to the present invention, the axial length ratio a/b representing the ratio between the interatomic distance a in the direction of a normal line to the base material of the crystal lattice of the aforementioned ferromagnetic metal layer 3, and the interatomic distance b in a direction within the plane of the base material, should preferably be from 1.002 to 1.008. By maintaining the distortion of the hcp lattice of the ferromagnetic metal layer within this range, a high coercive force value of at least 2000 (Oe) can be obtained. Consequently, the normalized coercive force ($Hc/Hk^{grain}$) of a high $Hk^{grain}$ ferromagnetic metal layer 3 can be increased, and a magnetic recording medium with superior recording and playback characteristics can be provided.

In those cases where the axial length ratio a/b representing the ratio between the interatomic distance a in the direction of a normal line to the base material and the interatomic distance b in a direction within the plane of the base material is at least 1.002, movement of the Cr atoms incorporated within the ferromagnetic metal layer 3 in a direction within the plane of the base material results in a lower overall system energy than movement of the Cr atoms in a direction of a normal line to the base material, and so it becomes easier for the Cr atoms to move preferentially within the plane of the base material. Furthermore, it is thought that when the axial length ratio a/b is within the range from 1.002 to 1.008, the degree of movement within the plane of the base material is very suitable for promoting Cr segregation towards the crystal grain boundaries. As a result, a non-magnetic Cr-rich layer is formed at the crystal grain boundaries, and crystal grains with Cr-poor interiors are formed, and so a system which combines a reduction in the interaction between crystal grains with a high $Hk^{grain}$ value can be realized.

In contrast, in cases where the axial length ratio a/b is less than 1.002, because the interatomic distance a in the direction of a normal line to the base material and the interatomic distance b in a direction within the plane of the base material are almost equal or differ by only a small amount, it is thought that the probability of the Cr atoms incorporated within the ferromagnetic metal layer 3 moving in a direction within the plane of the base material reduces, and so crystal growth is less likely to occur in a direction within the plane of the base material, and Cr segregation towards the crystal grain boundaries is less likely to occur. As a result, the interaction between crystal grains is large, and the value of $Hk^{grain}$ will be low.

Furthermore, in cases where the axial length ratio a/b is greater than 1.008, because the interatomic distance a in the direction of a normal line to the base material is much larger than the interatomic distance b in a direction within the plane of the base material, it is thought that Cr atoms incorporated within the ferromagnetic metal layer 3 will move readily in a direction within the plane of the base material, and furthermore the degree of that movement will be large, and so the Cr atoms will become uniformly distributed throughout the entire film. As a result, Cr segregation will not occur, and only a system with a large interaction between crystal grains and a low value of $Hk^{grain}$ can be achieved.

(Higher Recording Densities in Magnetic Recording Media)

A magnetic recording medium 10 according to the present invention represents a medium in which recording magnetization is formed parallel with the film surface of the ferromagnetic metal layer described above (namely, an in-plane magnetic recording medium). With such a medium, in order to improve the recording density, it is necessary to achieve further miniaturization of the recording magnetization. This miniaturization is achieved by reducing the playback signal output at the magnetic head in order to reduce the amount of leakage flux from each recording magnetization. Accordingly, in order to ensure the same S/N ratio, it is desirable to further reduce the medium noise, thought to be an effect of neighboring recording magnetization.

(Coercive Force of the Ferromagnetic Metal Layer: Hc, Anisotropic Magnetic Field: $Hk^{grain}$, Normalized Coercive Force: $Hc/Hk^{grain}$)

The "coercive force of the ferromagnetic metal layer: Hc" in the present invention refers to the coercivity of the medium determined from a magnetization curve measured using a vibrating sample magnetometer (called a VSM).

The "anisotropic magnetic field of the crystal grains: $Hk^{grain}$" in the present invention is the applied magnetic field which completely eliminates rotational hysteresis loss, as measured by a high sensitivity torque magnetometer. For magnetic recording media in which a ferromagnetic metal layer is formed on the surface of a base material with a metal underlayer disposed therebetween, both the coercive force and the anisotropic magnetic field measurements refer to values measured within the thin film plane.

The "normalized coercive force of the ferromagnetic metal layer: $Hc/Hk_{gain}$" in the present invention is the value obtained by dividing the coercive force Hc by the anisotropic magnetic field of the crystal grains $Hk^{grain}$, and this value represents the degree of improvement in the magnetic isolation of the crystal grains. This information has been previously reported by the inventor of the present invention in "Magnetization Reversal Mechanism Evaluated by Rotational Hysteresis Loss Analysis for the Thin Film Media", Migaku Takahashi, T. Shimatsu, M. Suekane, M. Miyamura, K. Yamaguchi and H. Yamasaki: IEEE Transactions on Magnetics, Vol. 28, 1992, pp. 3285.

Furthermore, according to Stoner-Wohlfarth theory, the normalized coercive force takes a value of 0.5 in the case where the crystal grains are completely magnetically isolated, and this value is the upper limit for the normalized coercive force.

Furthermore, in a publication by J. -G. Zhu and H. N. Bertram: Journal of Applied Physics, Vol. 63, 1988, pp. 3248, it is reported that a high value for the normalized coercive force of the ferromagnetic metal layer is the result of a reduction in the magnetic interaction between the individual crystal grains which make up the ferromagnetic metal layer, enabling a high coercive force to be realized.

The "crystalline magnetic anisotropy $Ku^{grain}$" in the present invention is the value obtained by multiplying by ½ the product of the saturated magnetization Ms and the anisotropic magnetic field $Hk^{grain}$, and the larger the value of this crystalline magnetic anisotropy $Ku^{grain}$ the more thermal agitation is suppressed, and as such this value acts as an indicator for judging thermally stable magnetic recording media.

According to the present invention, as described above, a magnetic recording medium can be obtained for which the anisotropic magnetic field $Hk^{grain}$ is at least 10,000 (Oe), and moreover the coercive force Hc is at least 2000 (Oe), and so the aforementioned $Ku^{grain}$ can be improved to a much greater extent than seen in conventional magnetic recording media, and the normalized coercive force can also be improved, and consequently a magnetic recording medium can be provided which is both thermally stable and displays superior recording and playback characteristics.

As follows is a description of the production of a magnetic recording medium 10 of the structure described above using sputtering techniques.

(Sputtering Method)

Examples of sputtering methods, which represent one example of a method of producing a magnetic recording medium 10 according to the present invention, include carrier type sputtering methods in which the base material 1 is moved across in front of the target while a thin film is formed, and stationary type sputtering methods in which the base material 1 is fixed in front of the target and a thin film then formed.

The former carrier type sputtering method is advantageous for low cost magnetic recording media production because it is very applicable to mass production, whereas the latter stationary type sputtering method enables the production of magnetic recording media with superior recording and playback characteristics because the incident angle of the sputtering grains relative to the base material 1 is stable. However, the production of a magnetic recording medium 10 according to the present invention is not limited to either a carrier type method or a stationary type method.

Examples of the impurities in the Ar gas used during film fabrication include $H_2O$, $O_2$, $CO_2$, $H_2$, $N_2$, $C_xH_y$, H, C, O and CO. Impurities which have a particular effect on the amount of oxygen incorporated within a film can be assumed to be $H_2O$, $O_2$, $CO_2$, O and CO. Accordingly, the concentration of impurities in the present invention represents the sum total of $H_2O$, $O_2$, $CO_2$, O and CO incorporated within the Ar gas used for film fabrication.

When a magnetic recording medium according to the present invention is produced, it is preferable that an ultra clean process is used in which the ultimate vacuum of the film fabrication chamber for forming the metal underlayer 2 and the ferromagnetic metal layer 3 shown in FIG. 1 is set to a value at the $10^{-9}$ Torr level, and the impurity concentration of the film fabrication gas is at a level of no more than 1 ppb. Provided such an ultra clean process is employed, a coercive force of at least 2000 (Oe) can be achieved even in those cases where the film thickness of the metal underlayer 2 is extremely thin. Accordingly, by reducing the film thickness of the metal underlayer 2, the size of the crystal grains of the ferromagnetic metal layer 3 can be reduced, and a magnetic recording medium with superior recording and playback characteristics can be produced.

However, in a production method of a magnetic recording medium of the present invention, the above type of ultra clean process is not a necessity, and even in cases where film fabrication is carried out using a conventional process, by appropriate control of the film fabrication conditions, a magnetic recording medium with a high Hc value and a high $Hk^{grain}$ value can still be produced.

(Cleaning Treatment Using High Frequency Sputtering)

In the present invention, an example of a "cleaning treatment using high frequency sputtering" includes a technique in which an alternating voltage from a RF (Radio Frequency, 13.56 MHz) power source is applied to a base material placed in a gas pressurized space containing a gas capable of electrical discharge. A feature of this technique is that it can also be applied in cases where the base material is not conductive. The effects of such cleaning treatments include an improvement in the adhesion of a thin film to the base material. However, the effects on the film properties of a thin film formed on top of the surface of a base material following cleaning treatment are largely unclear.

(Bias Application to a Base Material)

In the present invention "bias application to a base material" refers to the application of a direct current bias voltage to the base material 1 during film fabrication of the metal underlayer 2 and the ferromagnetic metal layer 3 of a magnetic recording medium.

By applying an appropriate bias voltage to the base material 1 while forming the metal underlayer 2 and the ferromagnetic metal layer 3, the lattice constants of the metal underlayer 2 and the ferromagnetic metal layer 3 can be altered. In other words, by adjusting the bias voltage applied to the base material 1, the lattice matching at the interface between the metal underlayer 2 and the ferromagnetic metal layer 3 can be adjusted, enabling the distortion of the crystal lattice of the ferromagnetic metal layer 3 to be controlled within an appropriate range. As a result, a magnetic recording medium which displays a high normalized coercive force and superior thermal stability can be produced.

Furthermore, application of a bias to the base material 1 produces not only the effect described above, but also has the effect of increasing the coercive force of the magnetic recording medium. This effect displays a tendency to be greater if the bias application is performed during the formation of both layers rather than during the formation of just one of the two films.

However, the aforementioned bias application can often also act on objects near the base material, namely on base material support members or base material holders, and as a result, gas and dust are generated in the space surrounding the base material, and there is a possibility of this gas or dust being incorporated within the thin film being produced, and producing instability in the film characteristics.

Furthermore, application of a bias to a base material also suffers from several unavoidable problems, including (1) the fact that the technique cannot be applied to non-magnetic substrates such as glass, (2) the fact that the saturation magnetic flux density (Bs) of the formed ferromagnetic metal layer is lowered, and (3) the fact that complicated mechanisms need to be provided within the film fabrication chamber.

Consequently, in those cases where bias application is performed in order to produce a distortion in the crystal lattice of the ferromagnetic metal layer 3, film fabrication should preferably be carried out under conditions in which the aforementioned phenomena do not materialize. Specifically, one such method involves suppressing the applied voltage bias to the lowest possible voltage by adjusting the lattice constant of the metal underlayer 2 via the alloy composition of the underfilms 2a, 2b.

(Ultimate Vacuum of the Film Fabrication Chamber used for forming the Metal Underlayer and/or the Ferromagnetic Metal Layer)

Conventionally, the "ultimate vacuum of the film fabrication chamber used for forming the metal underlayer and/or the ferromagnetic metal layer" is positioned as one of the film fabrication factors which affect the value of the coercive force depending on the material of the ferromagnetic metal layer.

Particularly in a ferromagnetic metal layer which uses a Co based alloy magnetic material which also incorporates Ta, it is thought that this effect is large in those cases where the aforementioned ultimate vacuum is low (for example, at the $10^{-6}$ to $10^{-7}$ Torr level). However, provided a metal underlayer 2 and a ferromagnetic metal layer 3 of the structures described above are used, a magnetic recording medium with a high normalized coercive force can still be produced by optimizing the film fabrication conditions, even if the film fabrication is conducted in a film fabrication chamber with an ultimate vacuum at the $10^{-6}$ to $10^{-7}$ Torr level. Of course, the film fabrication of the metal underlayer 2 and the ferromagnetic metal layer 3 of the present embodiment can also be carried out using an ultra clean process as proposed by the inventor of the present invention.

(Surface Temperature of the Base Material During Formation of the Metal Underlayer and/or the Ferromagnetic Metal Layer)

The "surface temperature of the base material during formation of the metal underlayer and/or the ferromagnetic metal layer" in the present invention is one of the film fabrication factors which affect the value of the coercive force, regardless of the material used in the ferromagnetic metal layer.

Provided the temperature is within a range which does not damage the base material, then film fabrication at higher surface temperatures is able to realize higher levels of coercive force. Damage to the base material refers to external changes such as warping, blistering or splitting, as well as internal changes such as magnetization of non-magnetic materials, or increases in degas volumes. However, in order to achieve a high surface temperature, generally some form of heating process needs to be performed, either in the film fabrication chamber or in a prior chamber. During this heating process, gas and dust are generated in the space surrounding the base material, and there is a possibility of this gas or dust being incorporated within the thin film being produced, and producing instability in the film characteristics.

Furthermore, a high base material surface temperature also suffers from the following problems.

(1) Magnetization of the non-magnetic NiP layer in a NiP/Al base material
(2) Distortion of the base material
(3) For a base material with a low thermal conductivity such as glass, it is difficult to generate and maintain a high temperature within the base material.

Consequently, it is preferable that either the aforementioned heating process is not performed, or that a production method is selected which enables the desired film characteristics to be achieved even with a lower temperature heating process.

(Surface Roughness of the Base Material, Ra)

An example of the surface roughness of a base material of the present invention is the center line average height Ra measured in a radial direction across the surface of a disk shaped base material.

An example of a suitable measuring apparatus for measuring the surface roughness Ra is a Talystep manufactured by Rank Taylor Hobson Ltd.

When the base material shifts from a stationary state and rotation is started, or alternatively in the reverse case where the base material shifts from a rotating state to a stationary state, then the surfaces of the magnetic recording medium and the magnetic head contact and slide (a CSS operation). At this time, in order to suppress adsorption of the magnetic head onto the medium surface as well as any increase in the coefficient of friction, it is preferable that the surface roughness Ra is large. In contrast, in the case where the base material has reached the maximum number of revolutions, then there is a need to ensure that the gap between the magnetic recording medium and the magnetic head, namely the flying height of the magnetic head, is maintained at as small a value as possible, and so smaller values of Ra are desirable. Consequently, the maximum and minimum values of the surface roughness Ra of the base material can be suitably determined using the above reasoning together with the required specifications for the magnetic recording medium.

For example, in the case of a magnetic head flying height of 24 μinch, Ra=6 nm to 8 nm. However, in order to further increase recording density, it is necessary to further reduce the flying height (the distance by which the magnetic head is separated from the surface of the magnetic recording medium during recording and playback operations) of the magnetic head. In order to respond to this requirement, it is important to further improve the flatness of the surface of the magnetic recording medium. For this reason, the surface roughness Ra of the base material should preferably be as low as possible. Accordingly, an appropriate production method should be selected which enables the various target film characteristics to be achieved, even in those cases where the surface roughness of the base material is small. For example, in the case of a structure in which a Ni—P layer is provided on top of an Al substrate, a texture can be formed and the value of Ra then reduced to no more than 1.5 nm, and furthermore the Ra value for a NiP/Al substrate which has undergone special polishing treatment can be reduced to a value from 0.5 nm to 0.7 nm.

(Texture Processing)

Examples of texture processing that can be performed on a base material of the present invention include methods which utilize mechanical grinding, methods utilizing chemical etching, and methods which rely on the provision of a physically irregular film. Particularly in the case of an aluminum alloy base material, which represents the most widely used base material for magnetic recording media, mechanical grinding methods are employed.

For example, a method exists wherein concentric circular fine scratches are formed on a (Ni—P) film provided on the surface of an aluminum alloy base material by using a tape in which abrasive grains for use in grinding have been adhered to the surface, and then pressing this tape onto the rotating base material. In this method, the abrasive grains for use in grinding may also be removed from the tape and used.

However, for the reasons outlined in the section above relating to surface roughness of the base material, it is preferable that either no texture processing is conducted, or alternatively that an appropriate production method is selected which enables the various target film characteristics to be achieved even if the texture is extremely fine.

EXAMPLES

As follows is a more detailed description of the present invention based on a series of examples, although the present invention is not limited to the examples presented.

Example 1

In this example, magnetic recording media provided with a multi-layered metal underlayer 2 structure comprising underfilms 2a, 2b as shown in FIG. 1 were produced using a variety of different compositions and film thickness values for the underfilm 2b. Film fabrication was carried out using a direct current magnetron method, using an ultra clean process with a film fabrication chamber with an ultimate vacuum at the $10^{-9}$ Torr level and a process gas with an impurity concentration of no more than 1 ppb. During film fabrication, the temperature of the base material was first raised to 225° C. using a radiant heater, and following heating of the base material, the base material surface underwent dry etching for a 3 second period using an Ar gas pressure of 13.5 mTorr and an applied power of 100 W. The Ar gas pressure was then lowered to 2 to 4 mTorr, and the aforementioned metal underlayer, ferromagnetic metal layer, and protective layer were formed.

Furthermore, during film fabrication of the metal underlayer and the ferromagnetic metal layer, no bias was applied to the base material.

In this example, the base material was a disc shaped NiP plated Al substrate which had undergone ultra smooth surface polishing (Ra<0.3 nm) and which had not been subjected to texture processing. A Cr target was used as the target for film fabrication of the first underfilm, a CrMo target was used as the target for film fabrication of the second underfilm, and a Co(24 at %)Cr(12 at %)Pt(4 at %)B target was used as the target for film fabrication of the ferromagnetic metal layer.

Although in this example direct current magnetron sputtering was used as the method of fabricating the metal underlayer and the ferromagnetic metal layer, other film fabrication methods such as RF sputtering, laser vapor deposition, or ion beam film fabrication could also be used.

Example 2

Next, magnetic recording media were produced using a CrW alloy as the aforementioned second underfilm, with a variety of different compositions and film thickness values employed for the CrW alloy. With the exception of this change, the media were produced in the same manner as described for the Example 1. Only those conditions which differ from the Example 1 are shown below, and the common preparation conditions for the magnetic recording media of the Example 1 and the Example 2 are shown in Table 1.

Second underfilm CrW
Second underfilm composition W proportion: 25 at %, 35 at %
Second underfilm thickness 1.5 nm to 8.5 nm

TABLE 1

| Film fabrication method | Direct current magnetron sputtering |
|---|---|
| Base material | NiP plated Al alloy |
| Surface state of base material | No texture (Ra < 0.3 nm) |
| Dry etching | 13.5 mTorr/100 W/ 3 seconds |
| Ultimate vacuum of film fabrication chamber | <1 × 10$^{-8}$ Torr |
| Process gas | Ar |
| Impurity concentration of Ar gas | <1 ppb |
| Ar gas pressure | 2 to 4 mTorr |
| Surface temperature of base material | 225° C. |
| Bias application to base material | None |
| First underfilm | Cr |
| Thickness of first underfilm | 1.5 to 8.5 nm |
| Second underfilm (composition) | CrMo (Mo: 20 to 40 at %) |
| Thickness of second underfilm | 1.5 to 8.5 nm |
| Ferromagnetic metal layer | Co(24)Cr(12)Pt(4)B(at %) |
| Protective film | Carbon (7 nm) |

The magnetic characteristics of each of the magnetic recording media produced in the above Examples 1 and 2 were measured using a VSM (vibrating sample magnetometer) and a high sensitivity torque magnetometer. The results of these measurements are shown in Table 2.

Furthermore, the results of the measurements by the high sensitivity torque magnetometer revealed that the $Hk^{grain}$ values for the magnetic recording media of the Examples 1 and 2 exceeded 10,000 (Oe).

TABLE 2

| | | First underfilm | | Second underfilm | | | |
|---|---|---|---|---|---|---|---|
| Sample No. | Film fabrication process | Composition (at %) | Film thickness (nm) | Composition (at %) | Film thickness (nm) | $t_2/t_1$ | Hc (kOe) |
| 1 | UC | Cr | 8.5 | Cr20Mo | 1.5 | 0.18 | 0.60 |
| 2 | UC | Cr | 7.5 | Cr20Mo | 2.5 | 0.33 | 1.20 |
| 3 | UC | Cr | 5 | Cr20Mo | 5 | 1.00 | 2.76 |
| 4 | UC | Cr | 2.5 | Cr20Mo | 7.5 | 3.00 | 1.69 |
| 5 | UC | Cr | 1.5 | Cr20Mo | 8.5 | 5.67 | 1.14 |
| 6 | UC | Cr | 8.5 | Cr30Mo | 1.5 | 0.18 | 1.03 |
| 7 | UC | Cr | 7.5 | Cr30Mo | 2.5 | 0.33 | 2.48 |
| 8 | UC | Cr | 5 | Cr30Mo | 5 | 1.00 | 3.14 |
| 9 | UC | Cr | 2.5 | Cr30Mo | 7.5 | 3.00 | 2.27 |
| 10 | UC | Cr | 1.5 | Cr30Mo | 8.5 | 5.67 | 1.75 |
| 11 | UC | Cr | 8.5 | Cr40Mo | 1.5 | 0.18 | 0.76 |
| 12 | UC | Cr | 7.5 | Cr40Mo | 2.5 | 0.33 | 2.38 |
| 13 | UC | Cr | 5 | Cr40Mo | 5 | 1.00 | 3.02 |
| 14 | UC | Cr | 2.5 | Cr40Mo | 7.5 | 3.00 | 2.38 |
| 15 | UC | Cr | 1.5 | Cr40Mo | 8.5 | 5.67 | 1.41 |
| 16 | UC | Cr | 8.5 | Cr25W | 1.5 | 0.18 | 0.90 |
| 17 | UC | Cr | 7.5 | Cr25W | 2.5 | 0.33 | 2.36 |
| 18 | UC | Cr | 5 | Cr25W | 5 | 1.00 | 2.44 |
| 19 | UC | Cr | 2.5 | Cr25W | 7.5 | 3.00 | 2.36 |
| 20 | UC | Cr | 1.5 | Cr25W | 8.5 | 5.67 | 1.75 |
| 21 | UC | Cr | 8.5 | Cr35W | 1.5 | 0.18 | 0.94 |
| 22 | UC | Cr | 7.5 | Cr35W | 2.5 | 0.33 | 2.01 |
| 23 | UC | Cr | 5 | Cr35W | 5 | 1.00 | 3.05 |
| 24 | UC | Cr | 2.5 | Cr35W | 7.5 | 3.00 | 2.61 |
| 25 | UC | Cr | 1.5 | Cr35W | 8.5 | 5.67 | 1.57 |

* UC refers to an ultra clean process

Figure 4:
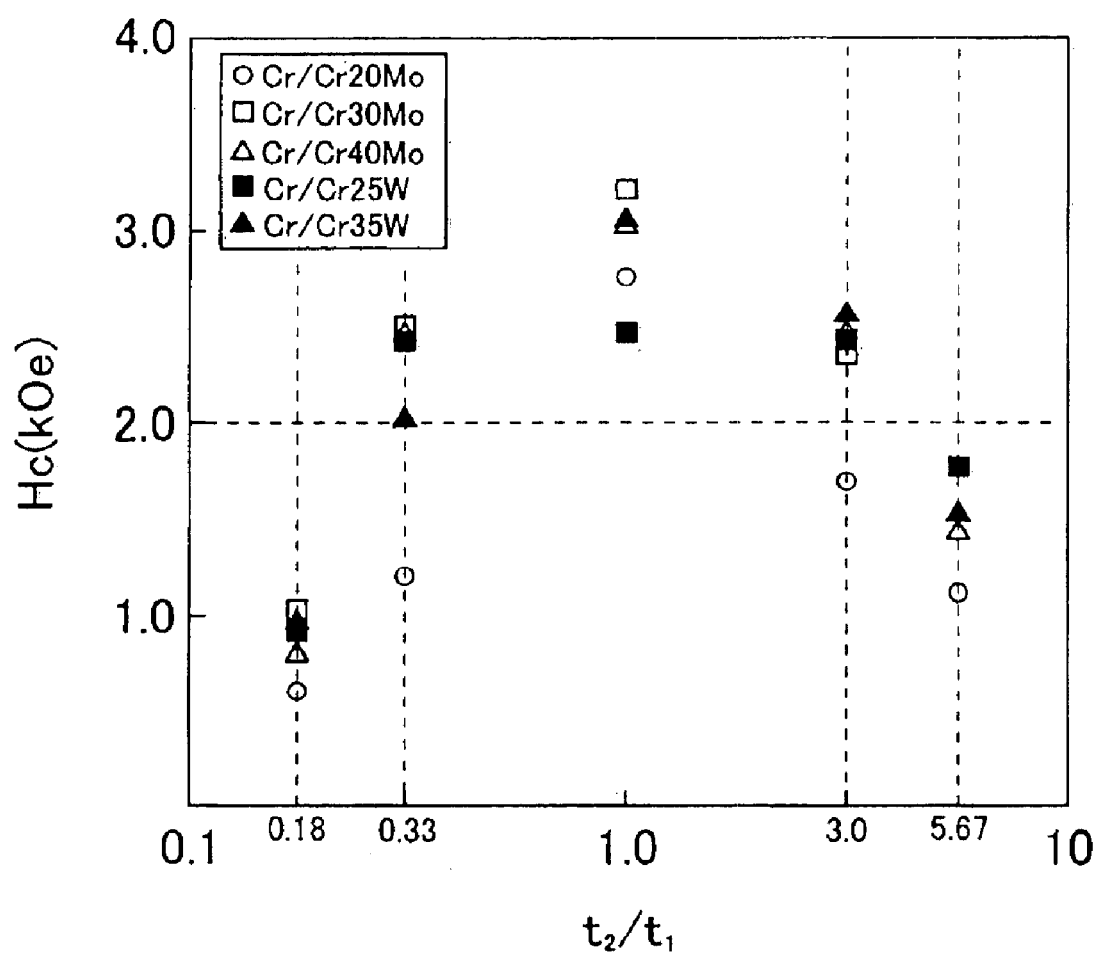
FIG. 4 is a graph showing the magnetic characteristics of an example 1 according to the present invention.

The results of the VSM measurements shown in Table 2 above are presented in graph form in FIG. 4. The vertical axis of the graph shown in FIG. 4 represents the coercive force (Hc), whereas the horizontal axis in FIG. 4 represents the film thickness ratio $t_2/t_1$ of the film thickness $t_1$ of the first underfilm and the film thickness $t_2$ of the second underfilm.

As is evident from the graph of FIG. 4, provided the film thickness ratio $t_2/t_1$ is no less than 1.0 and no more than 3.0, then in the cases of a second underfilm of a Cr30Mo alloy, a Cr40Mo alloy, a Cr25W alloy or a Cr35W alloy, a coercive force of more than 2000 (Oe) was obtained. Furthermore, in those cases in which a Cr20Mo alloy was used for the second underfilm, a coercive force exceeding 2000 (Oe) was achieved for a film thickness ratio $t_2/t_1$ of 1.0. In the above examples, Cr30Mo, for example, indicates a Cr alloy with 30 atomic percent Mo.

Example 3

In Example 3, as shown in Table 3, magnetic recording media were produced using a first underfilm of Cr with a fixed film thickness of 2.5 nm, and using a variety of different compositions and film thickness values for the second underfilm. With the exception of these changes to the first underfilm and the second underfilm, the magnetic recording media were produced using the same structures and processes as described for the Example 1.

Furthermore for the purposes of comparison, a magnetic recording medium was produced using the same structures and processes as described for the Example 1, with the exception that a Cr single layer structure with a film thickness of 2.5 nm was used as the metal underlayer.

The characteristics of the magnetic recording media produced in this example were measured using a VSM and a high sensitivity torque magnetometer. The results of these measurements are shown in Table 4, and the results from Table 4 are presented in graph form in FIG. 5. The vertical axis of the graph shown in FIG. 5 represents the coercive force (Hc), whereas the horizontal axis represents the film thickness ratio $t_2/t_1$ of the film thickness $t_1$ of the first underfilm and the film thickness $t_2$ of the second underfilm.

Figure 5:
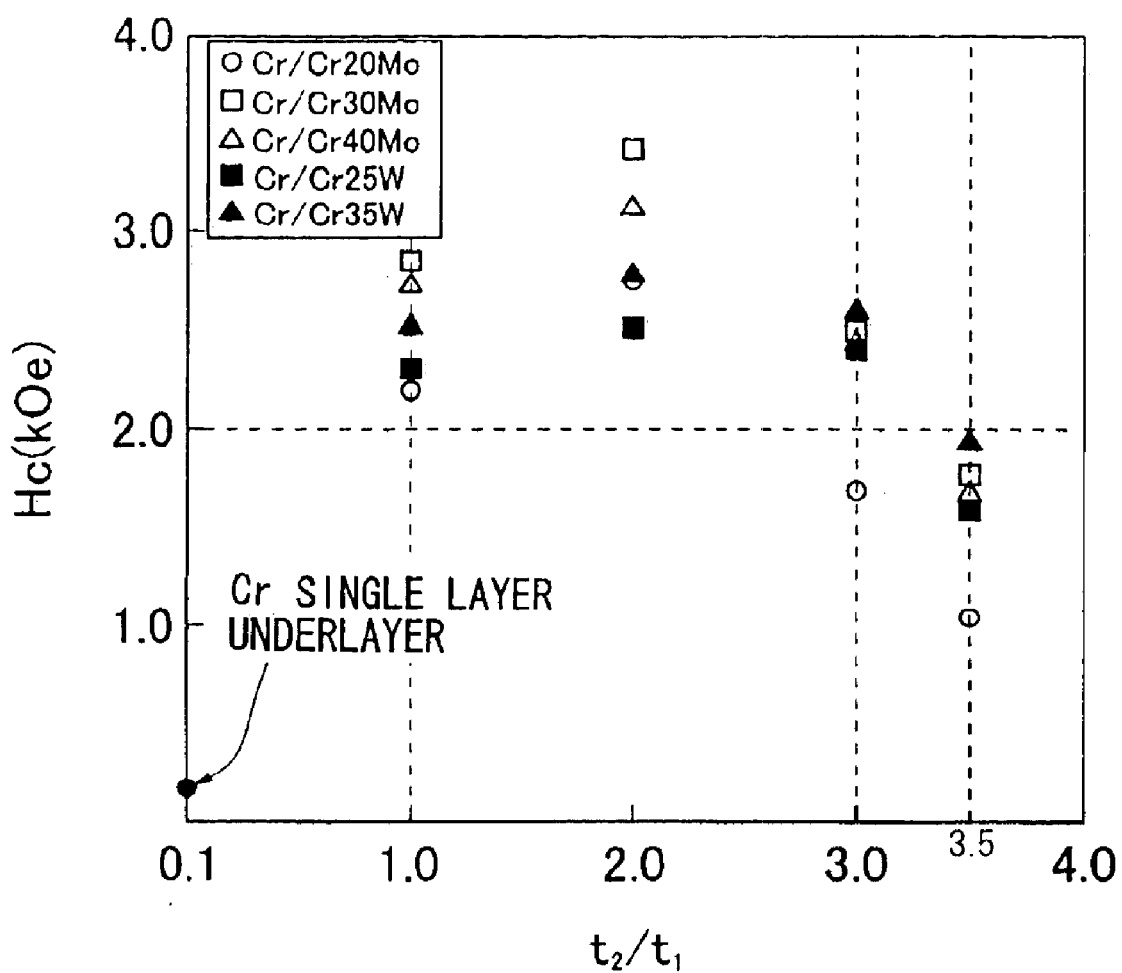
FIG. 5 is a graph showing the magnetic characteristics of an example 2 according to the present invention.

As is evident from the graph of FIG. 5, for magnetic recording media in which the film thickness ratio $t_2/t_1$ is no less than 1.0 and no more than 3.0, those media in which the second underfilm comprises a Cr30Mo alloy, a Cr40Mo alloy, a Cr25W alloy or a Cr35W alloy displayed a coercive force of more than 2000 (Oe). In contrast, the magnetic recording medium with a Cr underlayer produced for comparison purposes yielded only a very low coercive force value. Furthermore, in those magnetic recording media in which a Cr20Mo alloy was used for the second underfilm, a coercive force exceeding 2000 (Oe) was achieved for film thickness ratios $t_2/t_1$ of 1.0 to 2.0.

TABLE 3

| Film fabrication method | Direct current magnetron sputtering |
|---|---|
| Base material | NiP plated Al alloy |
| Surface state of base material | No texture (Ra < 0.3 nm) |
| Dry etching | 13.5 mTorr/100 W/ 3 seconds |
| Ultimate vacuum of film fabrication chamber | <1 × 10$^{-8}$ Torr |
| Process gas | Ar |
| Impurity concentration of Ar gas | <1 ppb |
| Ar gas pressure | 2 to 4 mTorr |
| Surface temperature of base material | 225° C. |
| Bias application to base material | None |
| First underfilm | Cr |
| Thickness of first underfilm | 2.5 nm (fixed) |
| Second underfilm (composition) | CrMo (Mo: 20 to 40 at %) |
| Second underfilm (composition) | CrW (W: 25, 35 at %) |
| Thickness of second underfilm | 0 to 8.5 nm |
| Ferromagnetic metal layer | Co(24)Cr(12)Pt(4)B(at %) |
| Protective film | Carbon (7 nm) |

TABLE 4

| Sample No. | Film fabrication process | First underfilm Composition (at %) | First underfilm Film thickness (nm) | Second underfilm Composition (at %) | Second underfilm Film thickness (nm) | $t_2/t_1$ | Hc (kOe) |
|---|---|---|---|---|---|---|---|
| 27 | UC | Cr | 2.5 | Cr20Mo | 2.5 | 1.00 | 2.15 |
| 28 | UC | Cr | 2.5 | Cr20Mo | 5 | 2.00 | 2.72 |
| 29 | UC | Cr | 2.5 | Cr20Mo | 7.5 | 3.00 | 1.69 |
| 30 | UC | Cr | 2.5 | Cr20Mo | 8.75 | 3.50 | 1.06 |
| 31 | UC | Cr | 2.5 | Cr30Mo | 2.5 | 1.00 | 2.89 |
| 32 | UC | Cr | 2.5 | Cr30Mo | 5 | 2.00 | 3.36 |
| 33 | UC | Cr | 2.5 | Cr30Mo | 7.5 | 3.00 | 2.48 |
| 34 | UC | Cr | 2.5 | Cr30Mo | 8.75 | 3.50 | 1.80 |
| 35 | UC | Cr | 2.5 | Cr40Mo | 2.5 | 1.00 | 2.79 |
| 36 | UC | Cr | 2.5 | Cr40Mo | 5 | 2.00 | 3.09 |
| 37 | UC | Cr | 2.5 | Cr40Mo | 7.5 | 3.00 | 2.38 |
| 38 | UC | Cr | 2.5 | Cr40Mo | 8.75 | 3.50 | 1.70 |
| 39 | UC | Cr | 2.5 | Cr25W | 2.5 | 1.00 | 2.27 |
| 40 | UC | Cr | 2.5 | Cr25W | 5 | 2.00 | 2.46 |
| 41 | UC | Cr | 2.5 | Cr25W | 7.5 | 3.00 | 2.36 |
| 42 | UC | Cr | 2.5 | Cr25W | 8.75 | 3.50 | 1.65 |
| 43 | UC | Cr | 2.5 | Cr35W | 2.5 | 1.00 | 2.49 |
| 44 | UC | Cr | 2.5 | Cr35W | 5 | 2.00 | 2.79 |
| 45 | UC | Cr | 2.5 | Cr35W | 7.5 | 3.00 | 2.61 |
| 46 | UC | Cr | 2.5 | Cr35W | 8.75 | 3.50 | 1.95 |
|    | UC | Cr | 2.5 | — | — | 0.00 | 0.10 |

* UC refers to an ultra clean process

Example 4

Next, magnetic recording media of the same structures as those described in the Example 1 were produced without using the aforementioned ultra clean process, but rather using a conventional process. In other words, in this example the ultimate vacuum of the film fabrication chamber was set at the $10^{-7}$ Torr level, and the impurity concentration of the film fabrication gas was no more than 1 ppm. The preparation conditions are shown in Table 5.

The results of measurements similar to those described for the Example 1 conducted on the magnetic recording media of this Example 4 are shown in Table 6. Comparing the results for the magnetic recording media of the Example 1 produced using the ultra clean process as shown in Table 2, and the results for the magnetic recording media of this example produced using a conventional process reveals that the film thickness values of the first underfilm and the second underfilm which yield the largest coercive force are slightly higher for the media of this example than for the magnetic recording media produced by the ultra clean process shown in Table 2, and that the maximum coercive force values are slightly lower for the media of this example, although a coercive force of more than 2000 (Oe) can still be obtained. Accordingly, provided a structure of the present invention is used, a high coercive force magnetic recording medium can be obtained by suitably controlling the film thickness of the metal underlayer 2, even in those cases where a conventional process is used during film fabrication.

TABLE 5

| Film fabrication method | Direct current magnetron sputtering |
|---|---|
| Base material | NiP plated Al alloy |
| Surface state of base material | No texture (Ra < 0.3 nm) |
| Dry etching | 13.5 mTorr/100 W/3 seconds |
| Ultimate vacuum of film fabrication chamber | <1 × $10^{-6}$ Torr |
| Process gas | Ar |
| Impurity concentration of Ar gas | <1 ppm |
| Ar gas pressure | 2 to 4 mTorr |
| Surface temperature of base material | 225° C. |
| Bias application to base material | None |
| First underfilm | Cr |
| Thickness of first underfilm | 2 to 10 nm |
| Second underfilm (composition) | CrMo (Mo: 20 to 40 at %) |
| Second underfilm (composition) | CrW (W: 25, 35 at %) |
| Thickness of second underfilm | 1.5 to 8.5 nm |
| Ferromagnetic metal layer | Co(24)Cr(12)Pt(4)B(at %) |
| Protective film | Carbon (7 nm) |

TABLE 6

| Sample No. | Film fabrication process | First underfilm Composition (at %) | First underfilm Film thickness (nm) | Second underfilm Composition (at %) | Second underfilm Film thickness (nm) | $t_2/t_1$ | Hc (kOe) |
|---|---|---|---|---|---|---|---|
| 47 | N | Cr | 8.5 | Cr20Mo | 1.5 | 0.18 | 0.25 |
| 48 | N | Cr | 7.5 | Cr20Mo | 2.5 | 0.33 | 0.70 |
| 49 | N | Cr | 5 | Cr20Mo | 5 | 1.00 | 2.00 |
| 50 | N | Cr | 2.5 | Cr20Mo | 7.5 | 3.00 | 1.50 |
| 51 | N | Cr | 1.5 | Cr20Mo | 8.5 | 5.67 | 0.40 |
| 52 | N | Cr | 8.5 | Cr30Mo | 1.5 | 0.18 | 0.70 |
| 53 | N | Cr | 7.5 | Cr30Mo | 2.5 | 0.33 | 1.50 |
| 54 | N | Cr | 5 | Cr30Mo | 5 | 1.00 | 2.50 |
| 55 | N | Cr | 2.5 | Cr30Mo | 7.5 | 3.00 | 2.10 |
| 56 | N | Cr | 1.5 | Cr30Mo | 8.5 | 5.67 | 1.50 |
| 57 | N | Cr | 8.5 | Cr40Mo | 1.5 | 0.18 | 0.60 |
| 58 | N | Cr | 7.5 | Cr40Mo | 2.5 | 0.33 | 1.40 |
| 59 | N | Cr | 5 | Cr40Mo | 5 | 1.00 | 2.50 |
| 60 | N | Cr | 2.5 | Cr40Mo | 7.5 | 3.00 | 2.08 |
| 61 | N | Cr | 1.5 | Cr40Mo | 8.5 | 5.67 | 1.20 |
| 62 | N | Cr | 8.5 | Cr25W | 1.5 | 0.18 | 0.65 |
| 63 | N | Cr | 7.5 | Cr25W | 2.5 | 0.33 | 1.30 |
| 64 | N | Cr | 5 | Cr25W | 5 | 1.00 | 2.06 |
| 65 | N | Cr | 2.5 | Cr25W | 7.5 | 3.00 | 1.90 |
| 66 | N | Cr | 1.5 | Cr25W | 8.5 | 5.67 | 1.65 |
| 67 | N | Cr | 8.5 | Cr35W | 1.5 | 0.18 | 0.79 |
| 68 | N | Cr | 7.5 | Cr35W | 2.5 | 0.33 | 1.56 |
| 69 | N | Cr | 5 | Cr35W | 5 | 1.00 | 2.24 |
| 70 | N | Cr | 2.5 | Cr35W | 7.5 | 3.00 | 2.26 |
| 71 | N | Cr | 1.5 | Cr35W | 8.5 | 5.67 | 1.47 |

* N refers to a normal process (a conventional process which does not utilize an ultra clean process)

Example 5

Next the magnetic recording media with the metal underlayer structures shown in Table 7 were produced. With the exception of the structure of the metal underlayer, these magnetic recording media were identical with the media described in the Example 1.

Figure 6:
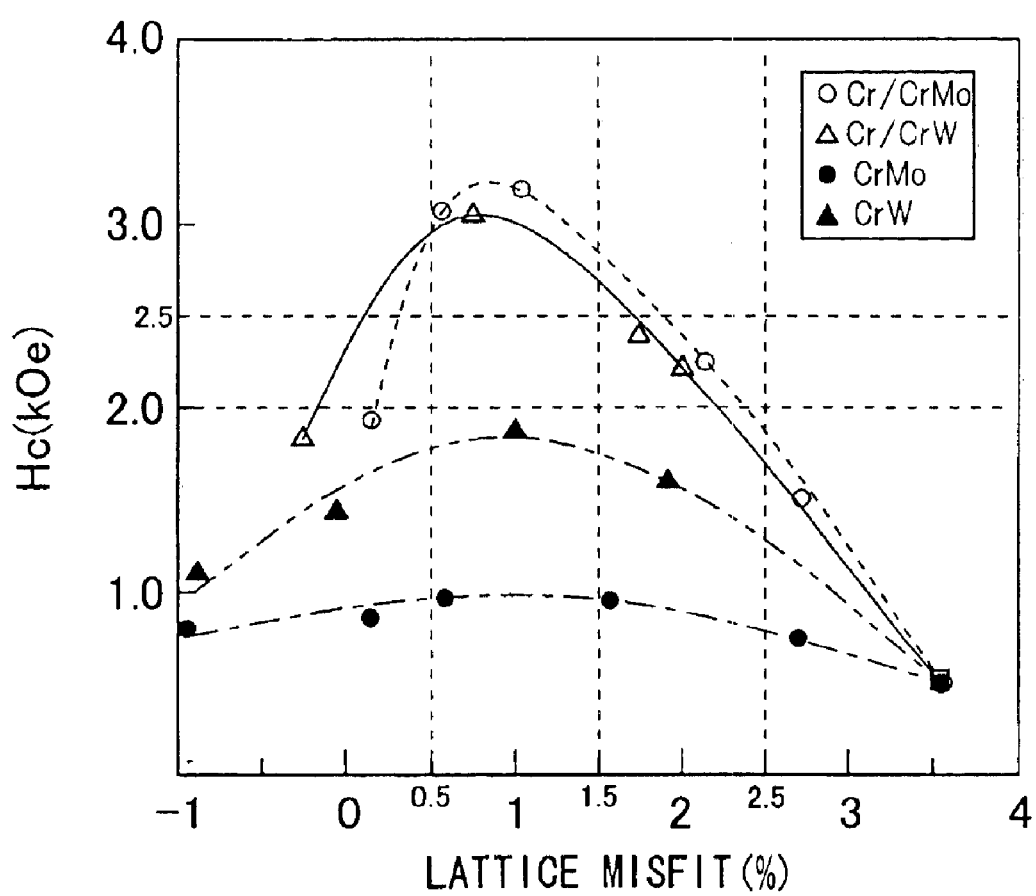
FIG. 6 is a graph showing XRD measurement results within the plane of the base material for an example 4 according to the present invention.

The results of structural analyses conducted on these magnetic recording media using an XRD (X-ray Diffractometer) are shown in Table 7, and the results from Table 7 are presented in graph form in FIG. 6. In FIG. 6, the vertical axis represents the coercive force, whereas the horizontal axis represents the lattice misfit at the interface between the metal underlayer and the ferromagnetic metal layer, which is calculated from the lattice constants of the two layers.

From Table 7 or FIG. 6 it is evident that provided the aforementioned lattice misfit is within a range from 0.5% to 2.5%, a coercive force exceeding 2000 (Oe) can be obtained. Furthermore, it is also clear that if the lattice misfit is within a range from 0.5% to 1.5%, then an even higher coercive force of more than 2500 (Oe) can be achieved.

In contrast, for magnetic recording media in which the underlayer comprises a single layer of CrMo or CrW, the coercive force in all cases was less than 2000 (Oe).

TABLE 7

| Sample No. | Film fabrication process | First underfilm Composition (at %) | First underfilm Film thickness (nm) | Second underfilm Composition (at %) | Second underfilm Film thickness (nm) | Lattice misfit (%) | Hc (kOe) |
|---|---|---|---|---|---|---|---|
| 72 | UC | Cr | 5 | Cr10Mo | 5 | 2.65 | 1.50 |
| 73 | UC | Cr | 5 | Cr20Mo | 5 | 2.20 | 2.25 |
| 74 | UC | Cr | 5 | Cr30Mo | 5 | 1.04 | 3.14 |
| 75 | UC | Cr | 5 | Cr40Mo | 5 | 0.55 | 3.02 |
| 76 | UC | Cr | 5 | Cr50Mo | 5 | 0.15 | 1.95 |
| 77 | UC | Cr | 5 | Cr15W | 5 | 2.00 | 2.20 |
| 78 | UC | Cr | 5 | Cr25W | 5 | 1.74 | 2.44 |
| 79 | UC | Cr | 5 | Cr35W | 5 | 0.75 | 3.05 |
| 80 | UC | Cr | 5 | Cr45W | 5 | −0.25 | 1.90 |
| 81 | UC | Cr | 10 | — | — | 3.54 | 0.425 |
| 82 | UC | — | — | Cr10Mo | 10 | 2.72 | 0.745 |
| 83 | UC | — | — | Cr20Mo | 10 | 1.54 | 0.96 |
| 84 | UC | — | — | Cr30Mo | 10 | 0.54 | 0.93 |
| 85 | UC | — | — | Cr40Mo | 10 | 0.17 | 0.88 |
| 86 | UC | — | — | Cr50Mo | 10 | −0.96 | 0.80 |
| 87 | UC | — | — | Cr15W | 10 | 1.90 | 1.60 |
| 88 | UC | — | — | Cr25W | 10 | 1.00 | 1.90 |
| 89 | UC | — | — | Cr35W | 10 | −0.25 | 1.40 |
| 90 | UC | — | — | Cr45W | 10 | −0.90 | 1.10 |

* UC refers to an ultra clean process

Next, for the magnetic recording media of the structures shown in Table 8, results from XRD measurements were used to calculate the interatomic distance a in the direction of the film thickness of the ferromagnetic metal layer, and the interatomic distance b in a direction within the plane of the base material. The axial length ratio a/b was then calculated and is shown in Table 8. The results from Table 8 are also presented in graph form in FIG. 7.

Figure 7:
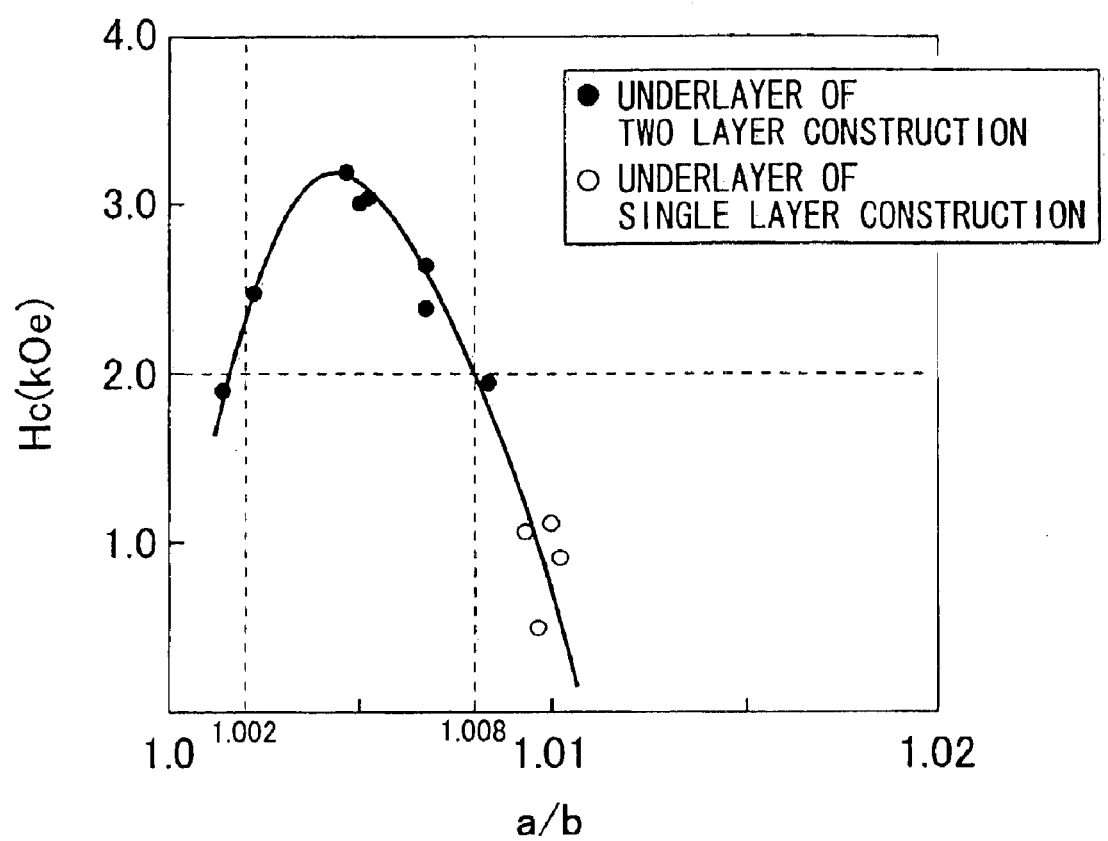
FIG. 7 is a graph showing XRD measurement results within the plane of the base material for an example 4 according to the present invention.

As can be seen in Table 8 or FIG. 7, for magnetic recording media in which the aforementioned axial length ratio a/b was no less than 1.002 and no more than 1.008, a coercive force of at least 2000 (Oe) was obtained. In contrast, those media in which the axial length ratio a/b was outside the above range, and those media in which the metal underlayer comprised a single layer structure, all displayed a coercive force of less than 2000 (Oe).

TABLE 8

| Sample No. | Film fabrication process | First underfilm Composition (at %) | First underfilm Film thickness (nm) | Second underfilm Composition (at %) | Second underfilm Film thickness (nm) | a/b | Hc (kOe) |
|---|---|---|---|---|---|---|---|
| 91 | UC | Cr | 5 | Cr20Mo | 5 | 1.0068 | 2.76 |
| 92 | UC | Cr | 5 | Cr30Mo | 5 | 1.0046 | 3.14 |
| 93 | UC | Cr | 5 | Cr40Mo | 5 | 1.0051 | 3.02 |
| 94 | UC | Cr | 5 | Cr50Mo | 5 | 1.0088 | 1.95 |
| 95 | UC | Cr | 6 | Cr70Mo | 5 | 1.0025 | 2.48 |
| 96 | UC | Cr | 7 | Cr80Mo | 5 | 1.0014 | 1.95 |
| 97 | UC | Cr | 5 | Cr25W | 5 | 1.0067 | 2.44 |
| 98 | UC | Cr | 5 | Cr35W | 5 | 1.0054 | 3.05 |
| 99 | UC | Cr | 10 | — | — | 1.0093 | 0.425 |
| 100 | UC | — | — | Cr20Mo | 10 | 1.0105 | 0.96 |
| 101 | UC | — | — | Cr30Mo | 10 | 1.0091 | 0.93 |
| 102 | UC | — | — | Cr40Mo | 10 | 1.0100 | 0.78 |

* UC refers to an ultra clean process (Magnetic Recording Device)

Figure 8:
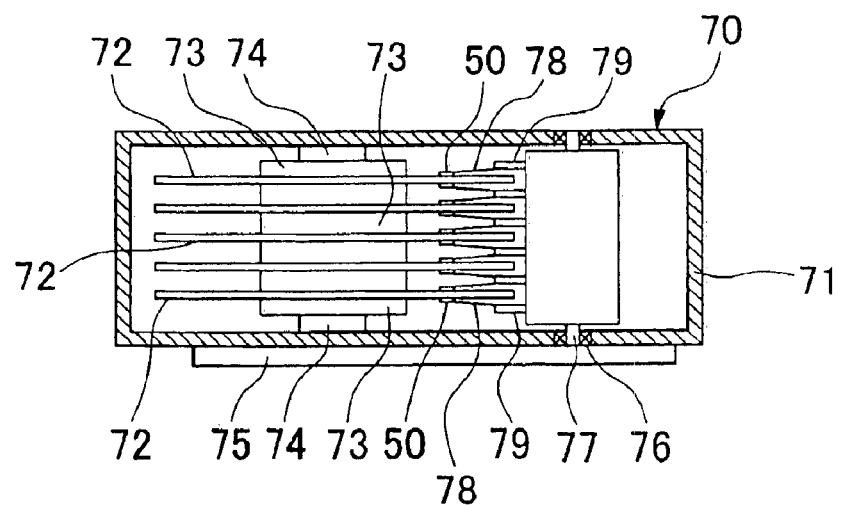
FIG. 8 is a side view showing an example of a magnetic recording device according to the present invention.
Figure 9:
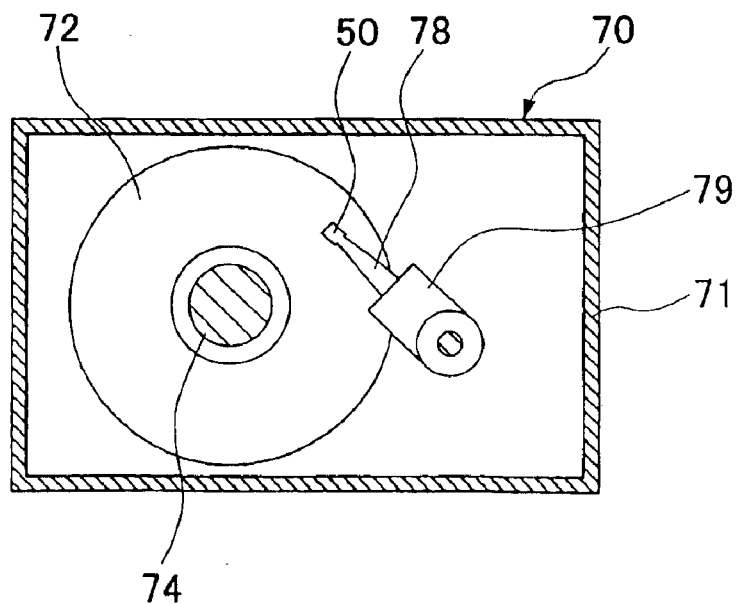
FIG. 9 is a plan view of the magnetic recording device shown in FIG. 8.
Figure 10:
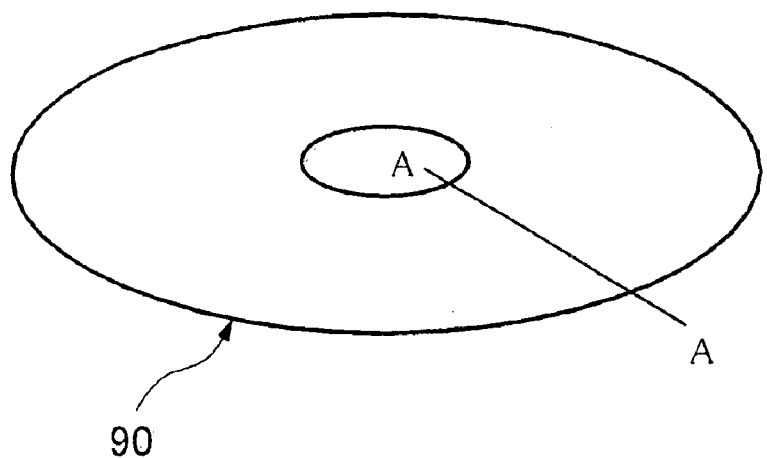
FIG. 10 is a perspective view showing a conventional hard disk as an example of a magnetic recording medium.

As follows is a description of a magnetic recording device according to the present invention with reference to the drawings. FIG. 8 is a side view showing a hard disk device as an example of a magnetic recording device according to the present invention, and FIG. 9 is a plan view of a magnetic recording layer shown in FIG. 8. In FIG. 8 and FIG. 9, 50 represents a magnetic head, 70 the hard disk device, 71 an external casing, 72 a magnetic recording medium, 73 a spacer, 79 a swing arm, and 78 a suspension.

The hard disk device 70 according to this embodiment houses magnetic recording media of the present invention which have been described above.

The external form of the hard disk device 70 is formed by the rectangular external casing 71, which contains sufficient internal space for housing the circular magnetic recording media 72 and the magnetic heads 50 and the like. A plurality of magnetic recording media 72 and alternating spacers 73 are passed through a spindle 74 inside the external casing 71. Furthermore, a bearing (not shown in the drawing) for the spindle 74 is provided within the external casing 71, and a motor 75 for rotating the spindle 74 is provided outside the external casing 71. With such a construction, the plurality of layers of magnetic recording media 72 are stacked up on top of one another, with the spacers 73 providing sufficient space between layers for the magnetic heads 50 to move in and out, and the magnetic recording media 72 are able to rotate freely about the spindle 74.

Inside the external casing 71 and positioned alongside the magnetic recording media 72 is provided a rotational axis 77 known as a rotary actuator which is supported in an arrangement parallel with the spindle 74 by a bearing 76. A plurality of swing arms 79 are attached to this rotational axis 77 so as to extend out into the space between each of the various magnetic recording media 72. A magnetic head 50 is attached to the tip of each swing arm 79 via an elongated triangular plate shaped suspension 78 which is fixed so as to be inclined towards the surface of the magnetic recording media 72 positioned above and below the swing arm. The magnetic heads 50 each comprise a recording element for writing information onto the magnetic recording media 72 and a playback element for reading information from the magnetic recording media 72, although these details are not shown in the diagram.

Each of the magnetic recording media 72, as described above, comprises a non-magnetic base material, with a metal underlayer and a ferromagnetic metal layer of a ferromagnetic alloy formed on top of this non-magnetic base material, and is a magnetic recording medium for which the coercive force Hc is at least 2000 (Oe) and the anisotropic magnetic field $Hk^{grain}$ is at least 10,000 (Oe).

According to the construction described above, the magnetic recording medium 72 is rotated, and the magnetic head 50 is moved across the magnetic recording medium 72 in a radial direction through the movement of the swing arm 79, and so the magnetic head 50 can be moved to any position on the magnetic recording medium 72.

In a hard disk device 70 of the above construction, by rotating the magnetic recording medium 72 while moving the swing arm 79 and the magnetic head 50, and then applying a magnetic field generated at the magnetic head 50 to the ferromagnetic metal layer of the magnetic recording medium 72, the desired magnetic information can be written to the magnetic recording medium 72. Furthermore, by moving the swing arm 79 and moving the magnetic head 50 to any position on the magnetic recording medium 72, and then using the playback element of the magnetic head 50 to detect the leakage magnetic field from the ferromagnetic metal layer of the magnetic recording medium 72, readout of the magnetic information can be carried out.

When the writing and reading of magnetic information is performed in this manner, provided the ferromagnetic metal layer of the magnetic recording medium 72 displays the superior normalized coercive force and thermal stability characteristics described above, then even if the inside of the hard disk device 70 is heated by the motor 75 and rises to a high temperature exceeding 100° C. for example, but continues to be used, the ferromagnetic metal layer of the magnetic recording medium 72 will still not suffer any deterioration. Furthermore, even if the device is used for extended periods, and is heated for prolonged periods, a hard disk device 70 can still be provided in which the recording and playback characteristics of the magnetic recording media 72 suffer no deterioration.

The hard disk device 70 described above based on FIG. 8 and FIG. 9 shows merely one example of a magnetic recording device, and the number of magnetic recording medium discs mounted in the magnetic recording device may be any number from one upwards, and similarly the number of magnetic heads provided in the device may also be any number from one upwards. In addition, the shape of the swing arms 79 and the drive system used are not limited to those shown in the drawings, and needless to say, other drive systems such as linear drive systems are also possible.

What is claimed is:

1. A magnetic recording medium comprising:
    a non-magnetic base material;
    a ferromagnetic metal layer of a CoCrPtB alloy formed on top of said non-magnetic base material; and
    a metal underlayer disposed between said base material and said ferromagnetic metal layer, wherein,
    a coercive force Hc is at least 2000 (Oe),
    an anisotropic magnetic field $Hk_{grain}$ is at least 10,000 (Oe), and
    said metal underlayer incorporates an underfilm of either one of Cr and a Cr alloy comprising Mo and/or W,
    wherein a lattice misfit of said metal underlayer and said ferromagnetic metal layer, as determined by an equation $(y-x)/(x/2+y/2) \cdot 100(\%)$, in which x represents a length obtained by multiplying by square root of 2 a lattice constant of said metal underlayer and y represents a c axis length of a crystal lattice of said ferromagnetic metal layer, is a value from 0.5% to 2.5%, and
    an axial length ratio a/b of an interatomic distance a in a direction of a normal line to said ferromagnetic metal layer relative to an interatomic distance b in a direction within a plane of said ferromagnetic metal layer is within a range from 1.002 to 1.008.

2. A magnetic recording medium according to claim 1, wherein said metal underlayer incorporates an underfilm of either one of i) Cr and ii) a Cr alloy comprising Mo and/or W, and at least one element selected from a group consisting of V, Nb, Hf, Zr, Ti, Mn, Ta, Ru, Re, Os, Ir, Rh, Pd, Pt, P, B, Si, Ge, N and O.

3. A magnetic recording medium according to claim 1, wherein a film thickness of said metal underlayer is within a range from 3 nm to 20 nm.

4. A magnetic recording medium according to claim 1, wherein said lattice misfit of said metal underlayer and said ferromagnetic metal layer is a value from 0.5% to 1.5%.

5. A magnetic recording medium according to claim 1, wherein said metal underlayer comprises a layered structure of two or more underfilms with different lattice constants.

6. A magnetic recording medium according to claim 5, wherein said metal underlayer is a two layered construction with a second underfilm layered on top of a first underfilm, and a film thickness ratio $t_2/t_1$ of a film thickness $t_1$ of said first underfilm and a film thickness $t_2$ of said second underfilm is within a range from 0.2 to 5.0.

7. A magnetic recording medium according to claim 6, wherein a film thickness of said first underfilm is within a range from 1.5 nm to 8.5 nm.

8. A magnetic recording medium according to claim 6, wherein a film thickness of said second underfilm is within a range from 1.5 nm to 8.5 nm.

9. A magnetic recording medium according to claim 1, wherein said metal underlayer and said ferromagnetic metal layer are formed in a film fabrication chamber with an ultimate vacuum at a $10^{-9}$ Torr level, using a film fabrication gas with an impurity concentration of no more than 1 ppb.

10. A magnetic recording medium according to claim 9, wherein said metal underlayer comprises a layered structure of two or more underfilms with different lattice constants.

11. A magnetic recording device comprising a magnetic recording medium according to claim 1, a drive section for driving said magnetic recording medium, and a magnetic head for carrying out recording and playback of magnetic information, wherein said magnetic head performs recording and playback of magnetic information on a moving said magnetic recording medium.

12. A magnetic recording device according to claim 11, wherein said metal underlayer comprises a layered structure of two or more underfilms with different lattice constants.

13. A magnetic recording medium, comprising:
    a non-magnetic base material;
    a metal underlayer formed on top of said non-magnetic base material and incorporating an underfilm of either one of Cr and a Cr alloy incorporating Mo or W; and
    a ferromagnetic metal layer of a CoCrPtB alloy formed on top of said non-magnetic base material and said metal underlayer so that said metal underlayer is disposed between said base material and said ferromagnetic metal layer, wherein,
    at a same time, a coercive force Hc is at least 2000 (Oe), and an anisotropic magnetic field $Hk^{grain}$ is at least 10,000 (Oe),
    a lattice misfit of said metal underlayer and said ferromagnetic metal layer, as determined by an equation $(y-x)/(x/2+y/2) \cdot 100(\%)$, in which x represents a length obtained by multiplying by square root of 2 a lattice constant of said metal underlayer and y represents a c axis length of a crystal lattice of said ferromagnetic metal layer, is a value from 0.5% to 2.5%, and
    an axial length ratio a/b of an interatomic distance a in a direction of a normal line to said ferromagnetic metal layer relative to an interatomic distance b in a direction within a plane of said ferromagnetic metal layer is within a range from 1.002 to 1.008.

14. The magnetic recording medium of claim 13, wherein, said underfilm comprises the Cr alloy incorporating Mo.

15. The magnetic recording medium of claim 13, wherein, said underfilm comprises the Cr alloy incorporating W.

16. The magnetic recording medium of claim 13, wherein, said underfilm comprises the Cr alloy incorporating Mo and W.

* * * * *